United States Patent
Heit et al.

[11] Patent Number: 5,906,267
[45] Date of Patent: May 25, 1999

[54] ZERO PRESSURE ACCUMULATION CONVEYOR

[75] Inventors: Martin A. Heit; John J. Wilkins, both of Cincinnati, Ohio; William C. Rau, Florence, Ky.

[73] Assignee: HK Systems, Inc., New Berlin, Wis.

[21] Appl. No.: 08/251,408

[22] Filed: May 31, 1994

Related U.S. Application Data

[60] Division of application No. 07/907,013, Jul. 1, 1992, Pat. No. 5,316,130, which is a continuation-in-part of application No. 07/725,644, Jul. 3, 1991, abandoned.

[51] Int. Cl.[6] ................................................ B65G 13/06
[52] U.S. Cl. .............................. 198/781.05; 198/781.01
[58] Field of Search ..................................... 198/781, 783

[56] References Cited

U.S. PATENT DOCUMENTS

| | | | |
|---|---|---|---|
| 3,420,355 | 1/1969 | De Good et al. | 198/781 |
| 3,537,568 | 11/1970 | Leach | 198/781 |
| 3,612,248 | 10/1971 | Wallis | 198/781 |
| 3,768,630 | 10/1973 | Inwood et al. | 198/781 |
| 3,840,110 | 10/1974 | Molt et al. | 198/781 |
| 3,877,565 | 4/1975 | Werntz | 198/781 |
| 4,108,303 | 8/1978 | Vogt et al. | 198/781 |
| 4,109,783 | 8/1978 | Vogt | 198/781 |
| 4,174,777 | 11/1979 | Riehle | 198/781 |
| 4,223,780 | 9/1980 | Saur | 198/781 |
| 4,344,527 | 8/1982 | Vogt et al. | 198/781 |
| 4,441,607 | 4/1984 | Bowman et al. | 198/781 |
| 4,473,149 | 9/1984 | Vogt et al. | 198/781 |
| 4,819,788 | 4/1989 | Van Der Schie | 198/781 |
| 4,854,445 | 8/1989 | Eaton et al. | 198/781 |
| 4,958,723 | 9/1990 | Bonifer et al. | 198/781 |
| 5,191,967 | 3/1993 | Woltjer et al. | 198/781 |

FOREIGN PATENT DOCUMENTS

| | | | |
|---|---|---|---|
| 2242999 | 4/1973 | Germany | 198/781 |
| 0442966 | 9/1974 | U.S.S.R. | 198/783 |
| 2233621 | 1/1991 | United Kingdom | 198/781 |

*Primary Examiner*—James R. Bidwell
*Attorney, Agent, or Firm*—Nilles & Nilles, S.C.

[57] ABSTRACT

A zero-pressure accumulating conveyor including a bed defined by rotatable rollers mounted in parallel sidewalls and powered by an endless drive chain. Pneumatic actuators lift the drive chain into engagement with the rollers to empower same. Sensor rollers divide the bed into distinct zones. Sensor rollers are retained in operative position relative to the conveyor bed by unique sensor brackets. A primary sensor roller bracket includes a bore with a piston movable there within; the cooperating secondary sensor roller bracket is spring biased in a first direction. Valves, and pneumatic circuitry controlled by such valves, extend along the length of the conveyor. Such valves are operated by the primary sensor roller brackets to regulate the flow of air pressure into the bores of the brackets and into the actuators. The actuators, when the pressure therein is bled-off, allow the chain in a particular zone to drop out of contact with the rotatable rollers. When the bore in the primary sensor roller bracket is pressurized, the bracket moves in an arc that forces the sensor roller below the plane of the conveyor. In such position, the sensor roller is not actuated as items travel thereover, and the life of the accumulating conveyor is significantly extended.

108 Claims, 17 Drawing Sheets

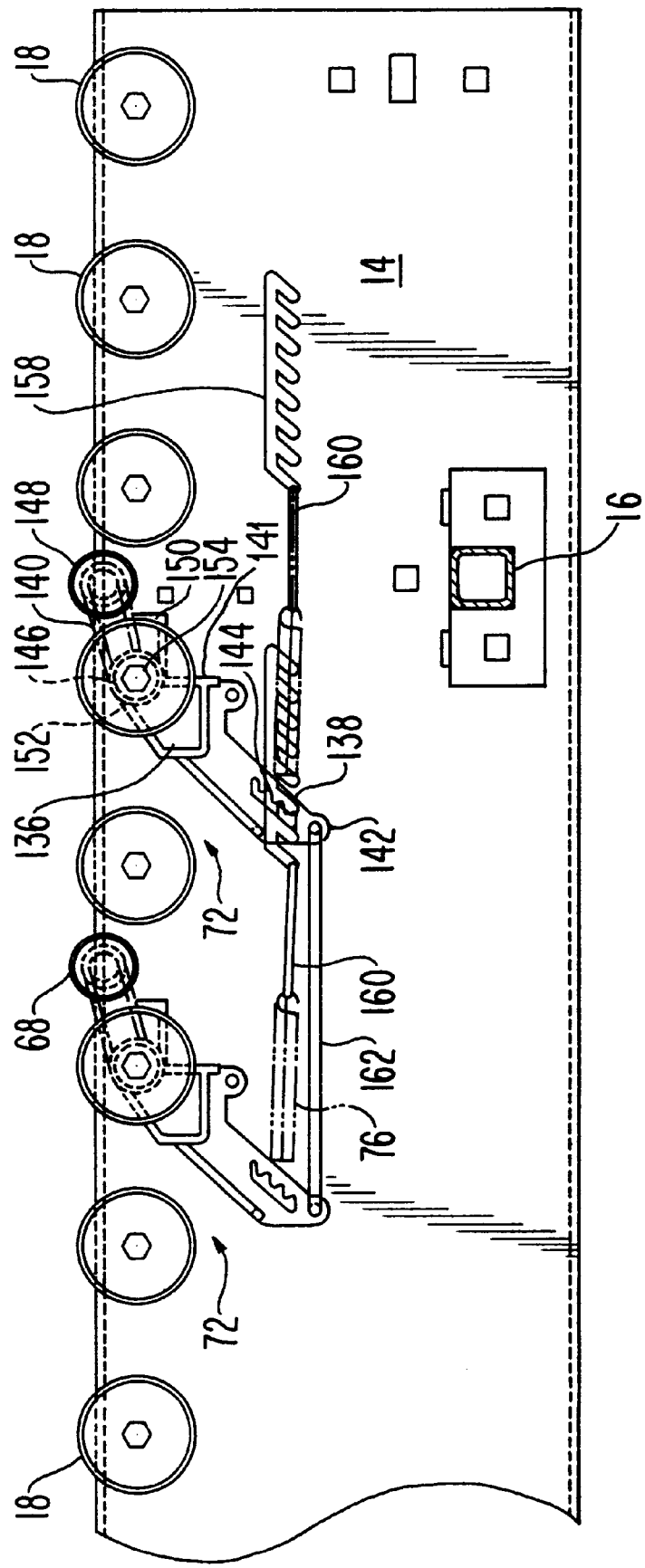

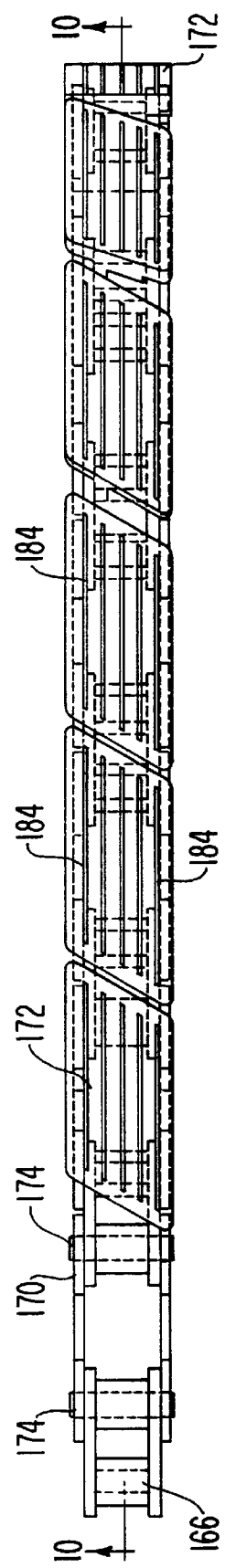
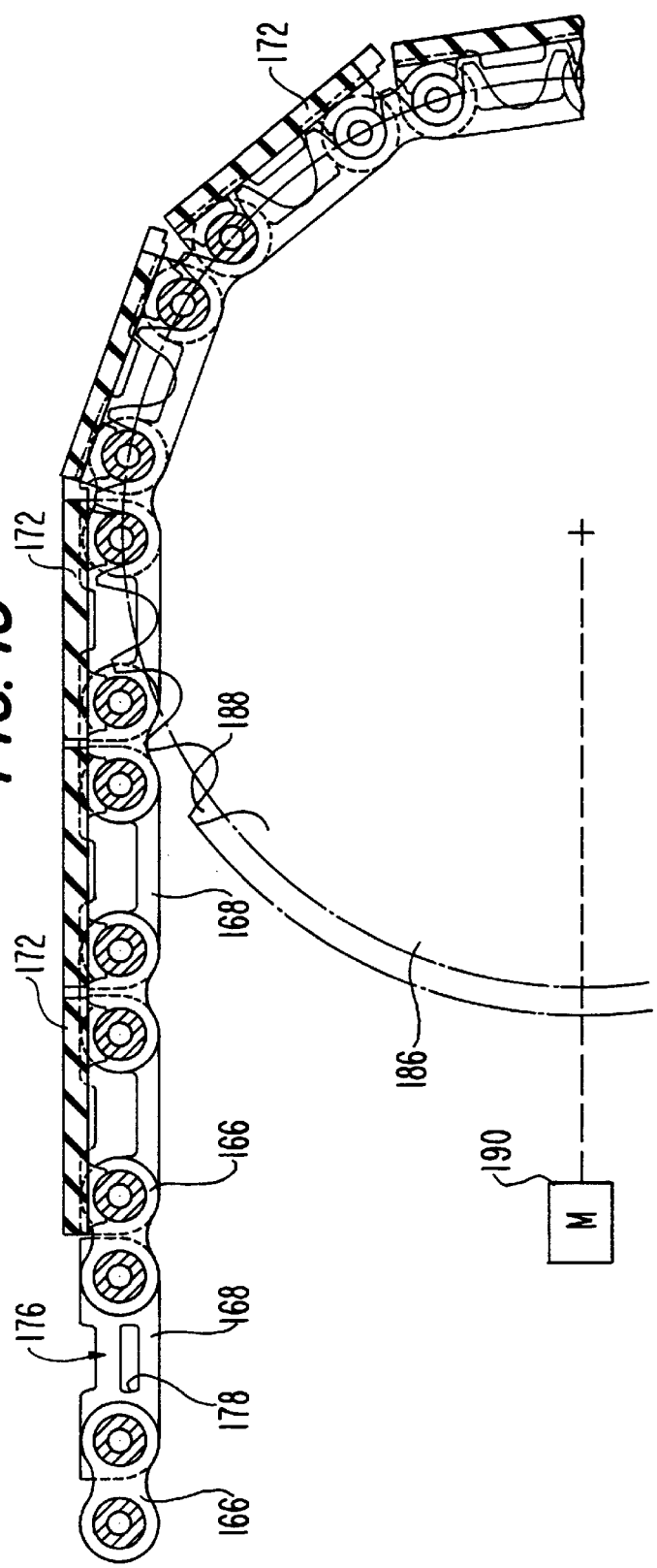
FIG. 9
FIG. 10

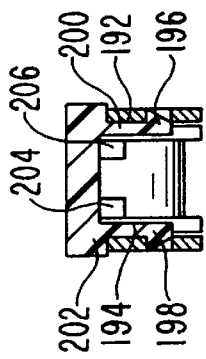
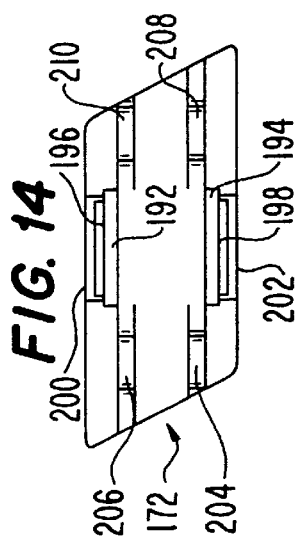
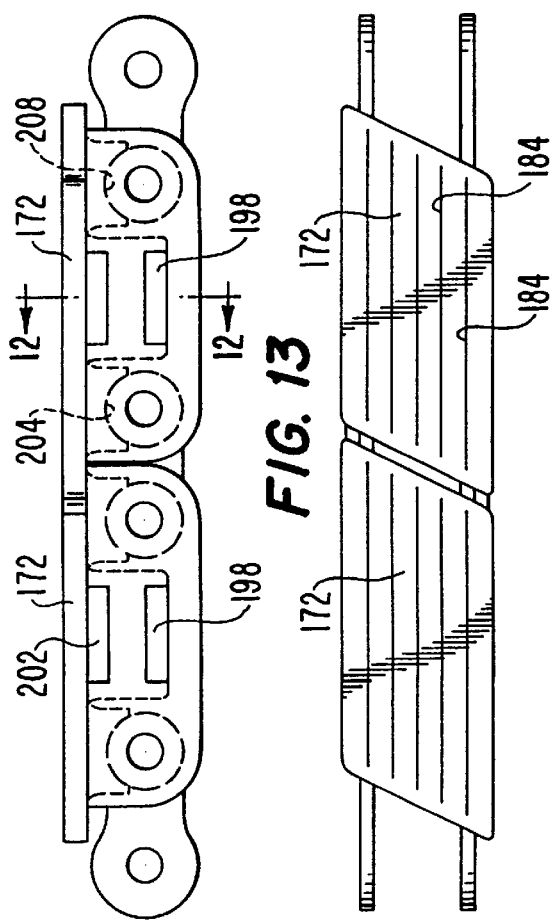
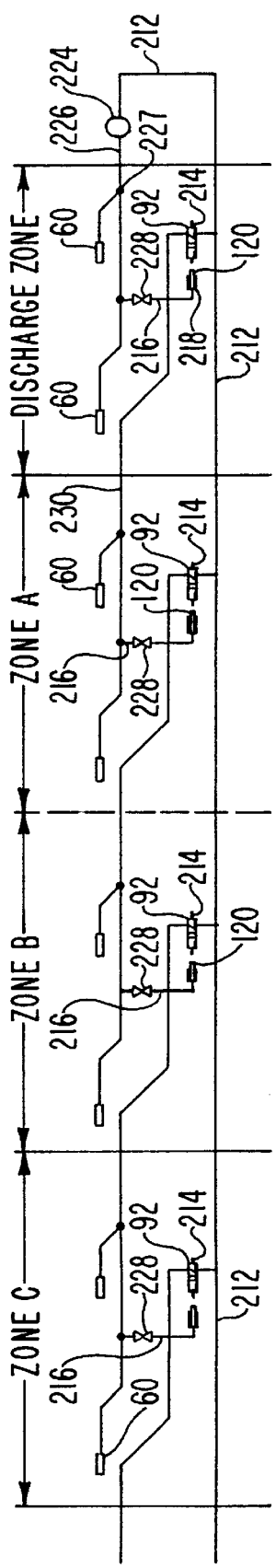

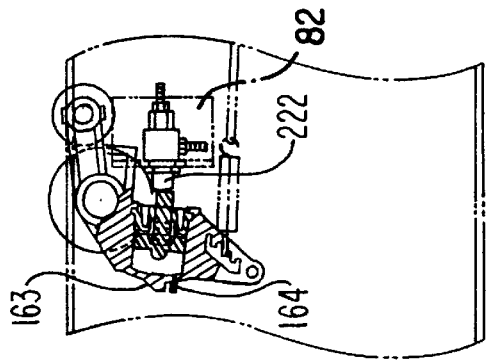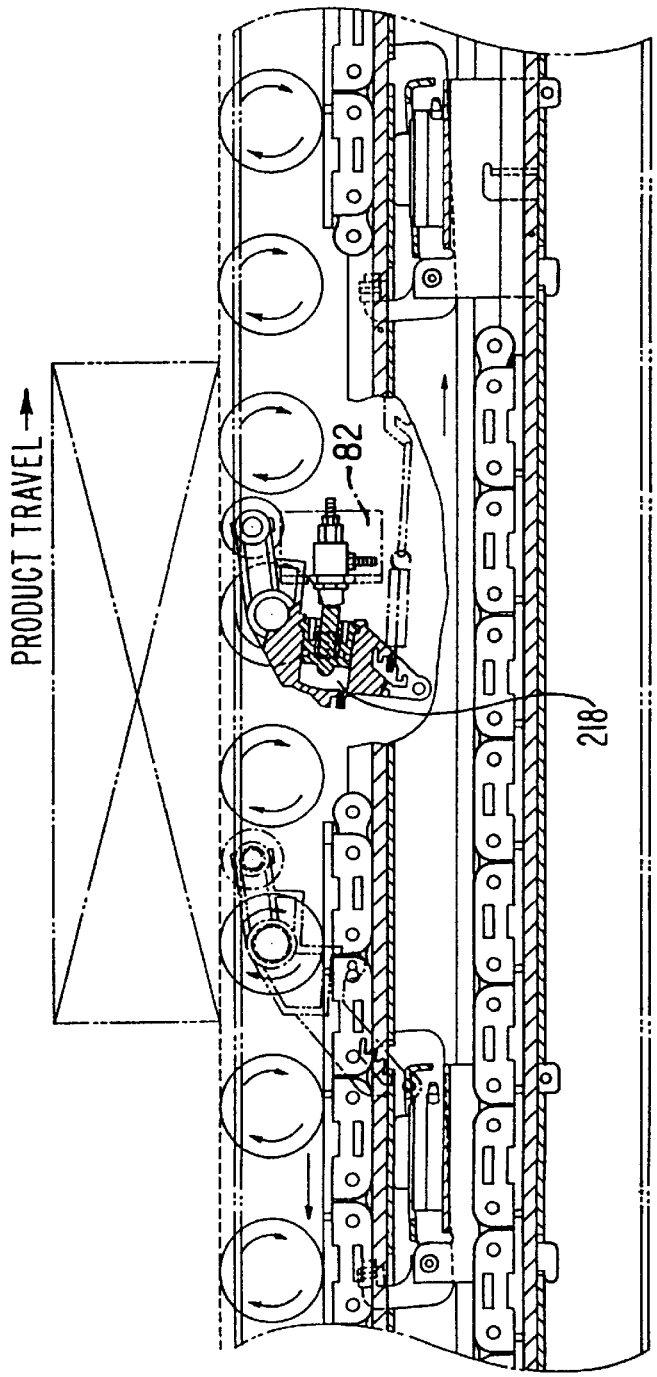

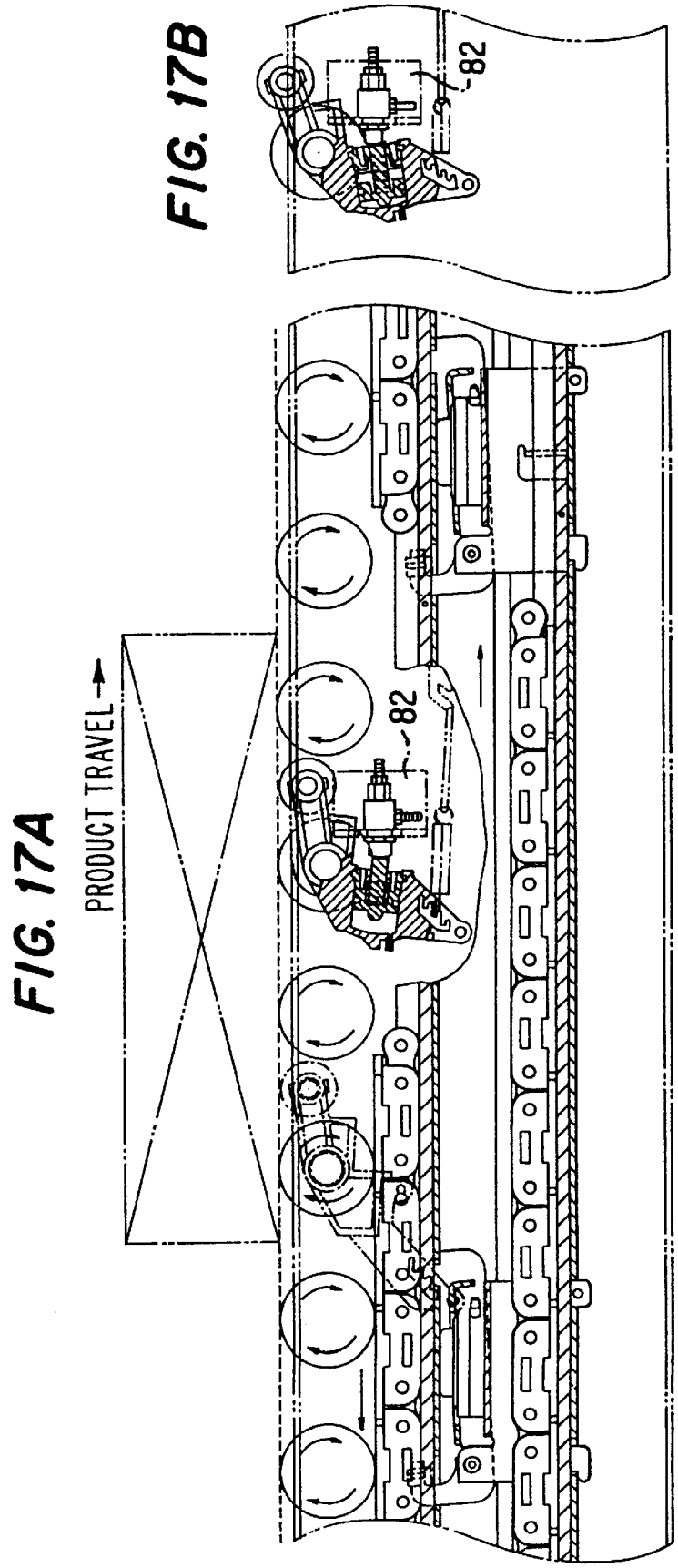

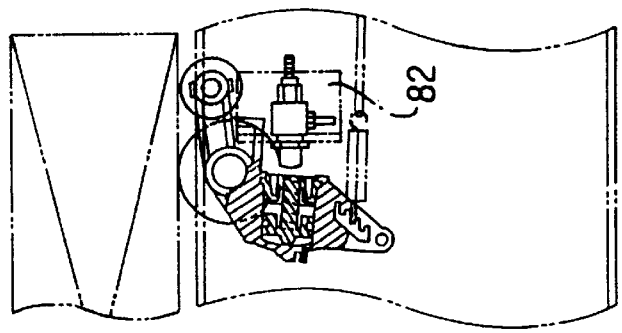
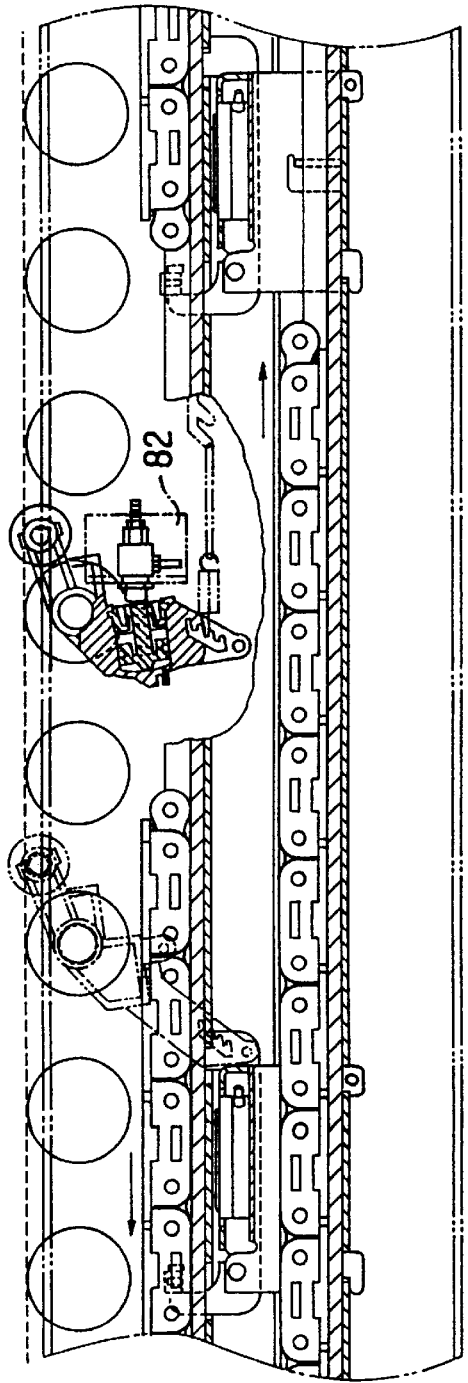
FIG. 18B
FIG. 18A

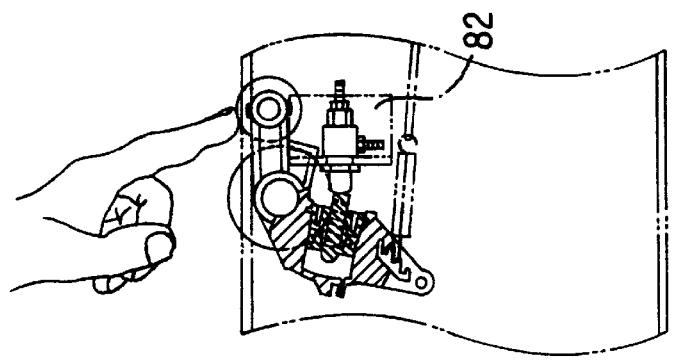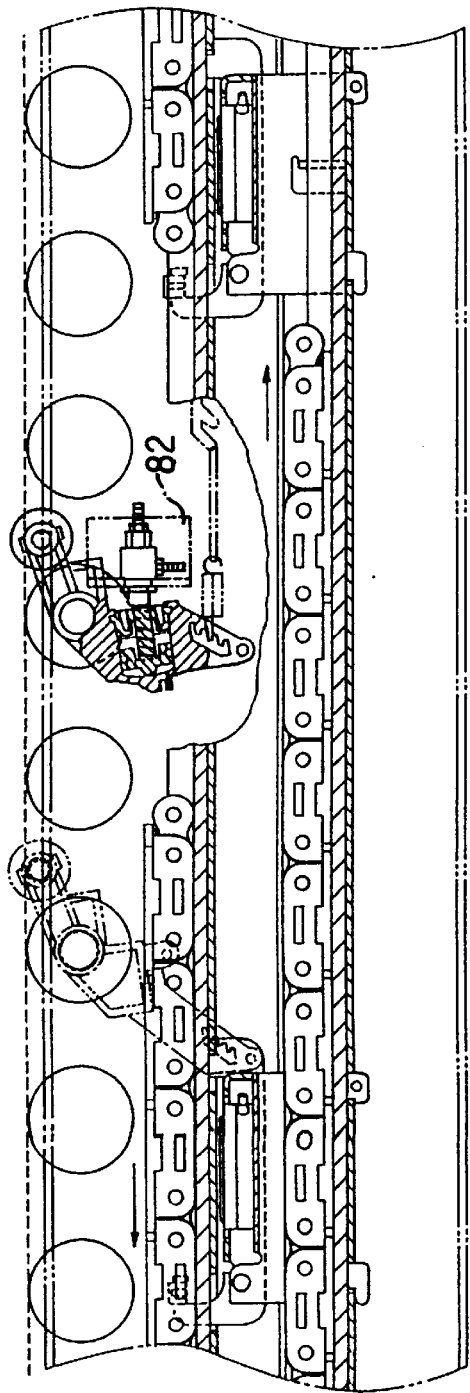

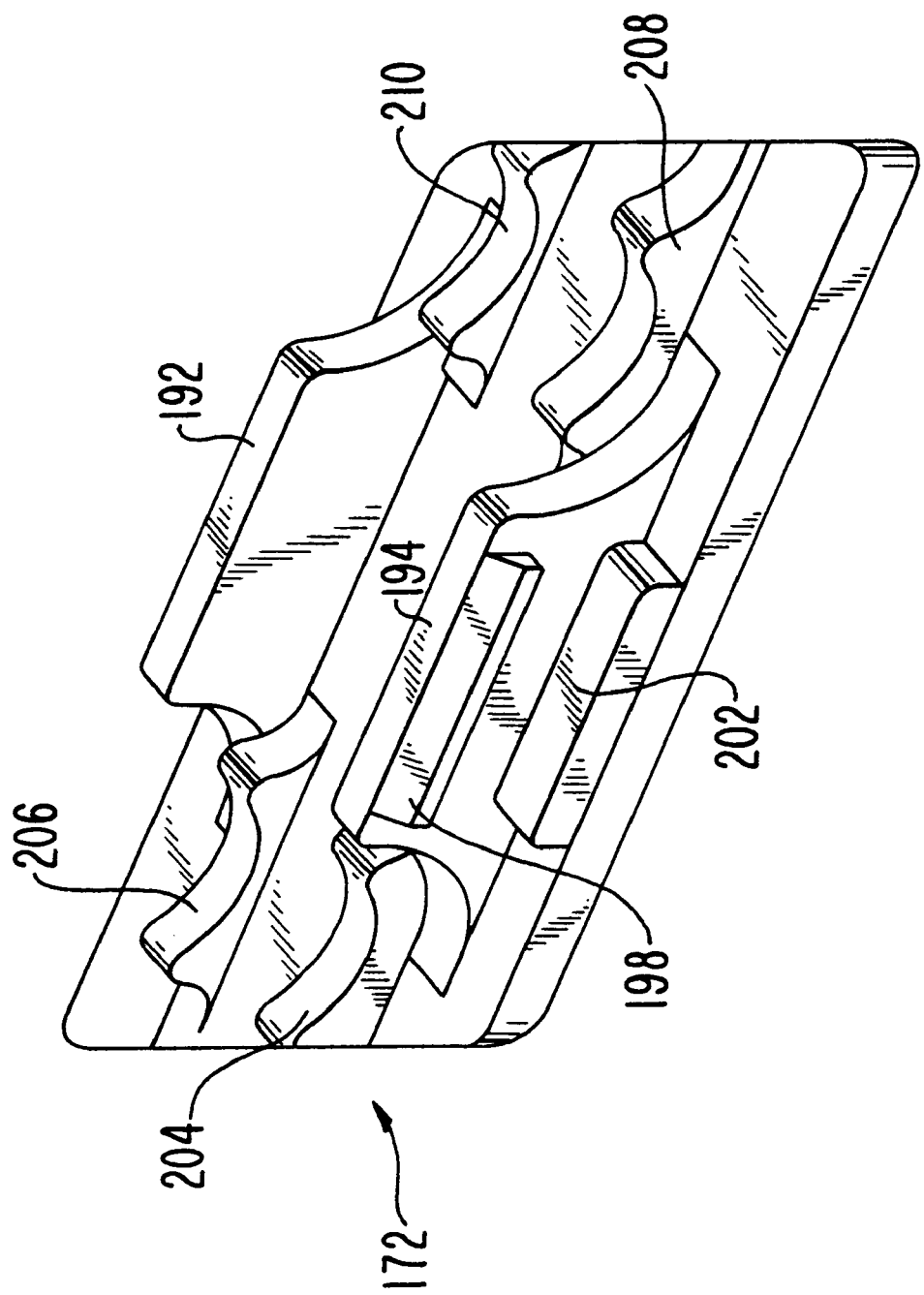

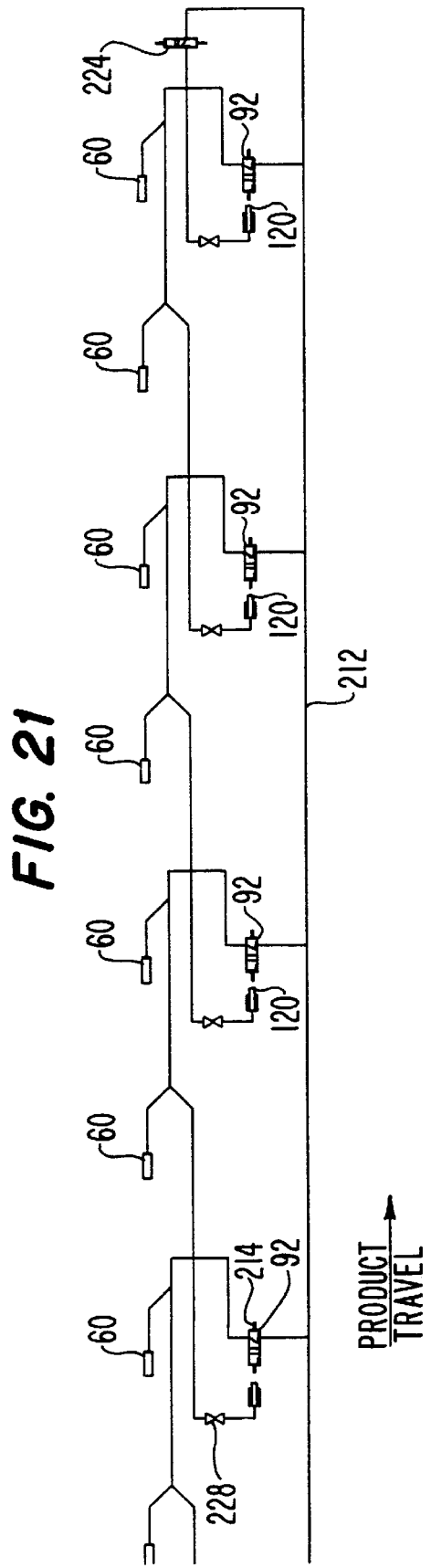

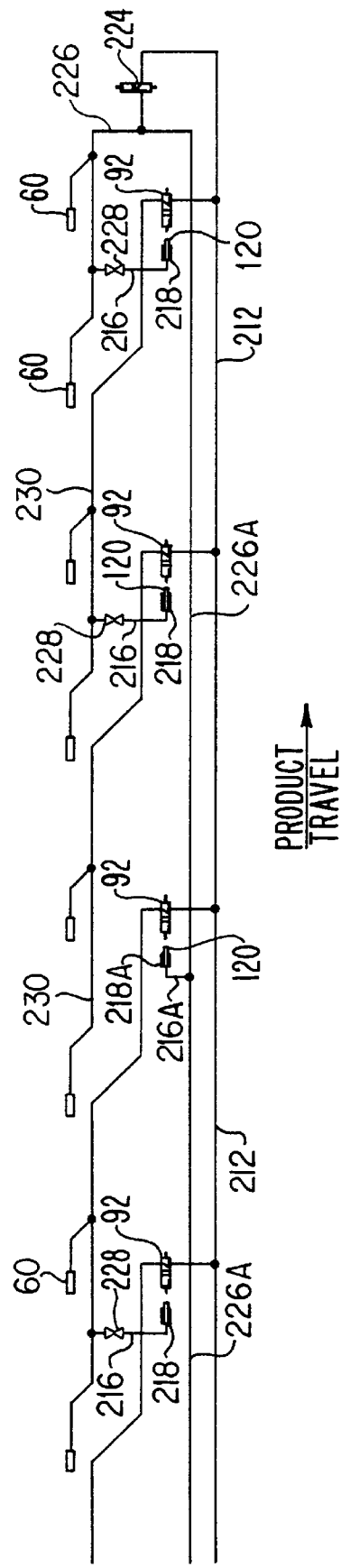

ZERO PRESSURE ACCUMULATION CONVEYOR

This is a divisional of application Ser. No. 07/907,013 filed on Jul. 1, 1992; now U.S. Pat. No. 5,316,130 which, in turn, is a continuation-in-part of Ser. No. 07/725,644, filed Jul. 3, 1991, and now abandoned.

FIELD OF THE INVENTION

This invention relates generally to accumulation conveyors, and more particularly to an accumulation conveyor in which the delivery, or non-delivery, of the propelling force to the rollers transporting the articles to be conveyed along the conveyor bed is pneumatically controlled by sensor assemblies and related circuitry.

BACKGROUND OF THE INVENTION

Powered accumulating conveyors are utilized wherever sorting, handling, processing, or other considerations, require that the conveyed items either (1) be stopped, or (2) bunched up, before proceeding down the conveyor bed. Conventional accumulating conveyors, which may be a hundred or more feet in length, are usually divided into "zones" that are nominally thirty-six inches in length. Each zone has a mechanism, such as a sensor roller, a mechanical trigger, a pneumatic switch, a photodetector, etc. that engages, and disengages, the driving power to the rollers of the preceding zone. When an accumulation operation is initiated, an external signal (which may be provided manually by a human operator or automatically by a timer control, or a computer program) disengages the rollers of the last, or discharge, zone. When the next item travelling down the conveyor bed depresses the sensor in the discharge zone, the sensor disengages the drive mechanism in the preceding upstream zone. When an item contacts the sensor in the preceding upstream zone, the process is repeated, in a series of steps, in each preceding upstream zone.

To illustrate, U.S. Pat. No. 3,612,248, granted Oct. 12, 1971, to Charles W. Wallis, discloses an accumulating roller conveyor comprising a plurality of longitudinally spaced, transversely extending article carrying rollers 10 with a belt 11 positioned beneath the rollers. Pressure rollers 12 are normally held in position against the belt to press the belt against the article carrying rollers by expansible chambers (30) to which fluid is supplied. A fluidic switch (16) is provided along the path of the articles, and when an article is stopped in position overlying the switch, the fluidic switch functions to deflate the expansible Chamber, permitting the pressure rollers to move away from the belt, so that rotation of the article-carrying rollers is interrupted.

U.S. Pat. No. 3,768,630, granted Oct. 30, 1973 to R. A. Inwood et al, discloses a powered roller accumulator conveyor having a powered propelling member, such as belt 16, passing through a plurality of independent accumulating zones (zones A, B, C, etc.) arranged along the conveyor. The propelling member is shiftable between driving, and non-driving, positions (compare FIGS. 3 and 4), with respect to the powered rollers 14 by vertically. shiftable, supporting rollers 18, operated by pneumatically powered actuators, such as tube-like member 30 and support plate 32, that engage one end of shaft 20 for roller 18. Each actuator is controlled by a series of valves 100 connected to a source 122 of fluid pressure, as shown schematically in FIGS. 7 and 8.

In the accumulating position of FIG. 7, each actuator is connected through an article-detecting sensor-operated valve 44 to the source of fluid pressure. The plunger 66 of valve 44 is influenced by sensor roller 49 that pivots flange 58 relative to the plunger, when a parcel contacts the roller. The shank 99 of the plunger 66 cooperates with ball valve 86 to control the flow of fluid away from the actuator 30. Each sensing assembly 46 is biased upwardly by spring 62 above the plane of the pressure rollers to be contacted by each object moving along the accumulator conveyor, as shown in FIG. 2. In an override or discharge position, shuttle valves 100 associated with each actuator are series connected to the source of fluid pressure, through a main control valve (such as three-way valve 131). The valves and are operative to direct the flow of fluid from the sensor operated valve 44, to energize each of the actuators 30, in each of the zones, to shift all of the operating zones into driving position.

U.S. Pat. No. 3,840,110, granted Oct. 8, 1974, to R. P. Molt et al, discloses a live roller, zero pressure accumulation conveyor 11, including a drive shaft 16 and a plurality of axially aligned countershafts 20. Each countershaft is driven by the drive shaft through a clutch 25 for selective power transmission to individual groups of conveyor rollers 14. Each group of rollers has, at its downstream end, a trigger device 51 (FIGS. 8 and 9) which senses the presence of a conveyed article. The trigger devices, which are operatively associated with air valves 52, 53, operate to selectively engage, and disengage, the clutch associated therewith, to achieve, and maintain, the desired spicing between articles being transported on the conveyor. Preferably, dual trigger devices (51x; 51y) are used in a manner which requires coincident actuation of both trigger devices before the clutch associated with a given group of rollers is disengaged (note column 3, line 63—column 4, line 5).

U.S. Pat. No. 4,108,303, granted Aug. 22, 1978, to R. K. Vogt and M. A. Heit, discloses an accumulator conveyor that includes a plurality of article accumulating zones A–E extending between the infeed and discharge ends of the conveyor. Each zone of the conveyor includes at least one power transmission assembly 17. All of the assemblies are powered by a single flexible drive member, such as an endless chain 56a, 56b. Each power transmission assembly includes a fluid ram 36, with a flexible diaphragm 58, which cooperates with a power wheel 37 to move that power wheel into, and out of, driving engagement with the article propelling member(s), such as rollers 11, within the zone that it serves. Operation of the transmission assemblies is controlled by a fluid control circuit 80. The fluid control circuit is influenced by sensor devices 18, which provide sensor valve 33, with a mechanical signal indicating whether, or not, an article is present, or absent, from a particular zone; the signal activates, or deactivates, the transmission assemblies 17 within the zone. As shown in FIG. 1, each sensor device 18 includes a sensor roller 19, a bracket 20, and a spring 28 for urging the sensor device to an operative position slightly above the plane of the upper surface of the rollers and/or roller bed.

Other accumulator conveyors are disclosed in U.S. Pat. No. 4,109,783, granted Aug. 29, 1978, to Robert K. Vogt; in U.S. Pat. Nos. 4,344,527 and 4,473,149, granted to Robert K. Vogt and Martin A. Heit, on Aug. 17, 1982 and Sep. 25, 1984, respectively.

BRIEF DESCRIPTION OF THE INVENTION

Under most circumstances, an item traveling along the bed of a known accumulating conveyor will strike the roller, or trigger, or other sensing member, of the sensor assembly associated with each successive zone. The roller will be depressed by the weight of the item, and will cycle, momentarily, the drive disengagement mechanism associated with the preceding upstream zone. Thus, for any given length of known accumulating conveyor, each sensor assembly will be actuated by each conveyed item.

This inflexible relationship in known accumulating conveyors results in inefficiency of operation, for the conveyed items are spaced out at least a zone apart, and because compressed air, or any other source of energy used to operate the sensor roller and drive engagement assemblies, will be wasted. Furthermore, the repeated, high speed striking of the items against the sensor roller, and the cycling of the drive engagement system, causes significant noise. The noise problem is accentuated in warehouses, distribution centers, assembly lines, and the like, where several conveyors are used side-by-side, and the noise build-up becomes intensified.

Even more significantly, the repeated, high speed, and, in some instances, almost constant operation of the sensor assemblies and drive disengagement mechanisms, contributes to increased maintenance requirements, and reductions in the operational life of the conveyor.

To counteract the known shortcomings of conventional accumulating conveyors, the instant invention contemplates sensor assemblies that may be lowered below the operating plane of the conveyor rollers, and raised, when needed, into an operative position above the operating plane of the conveyor rollers. Thus, the sensor assemblies, and the drive disengagement mechanisms controlled thereby, are not cycled continuously. The as-needed operation of the sensor assemblies, and drive disengagement mechanisms, enhances the efficiency of the conveyor, reduces the maintenance requirements, and extends considerably the operational life of the instant accumulating conveyor. A significant reduction in operating noise is also realized, and the reduction in component wear is unprecedented.

The instant accumulating conveyor is versatile, for the items accumulated on the discharge zone may be released therefrom in a singulation mode (serial fashion), or in a slug, or ganged fashion. In either event, the conveyor operates smoothly, with high throughput, and minimum spacing between items, yet without pressing against adjacent items with any force (zero pressure accumulation).

Furthermore, the instant accumulating conveyor is controlled by pneumatic circuitry that is operatively associated with the sensor assemblies for each zone; a valve is situated next to the bracket of each sensor roller assembly and is operated thereby. The pneumatic circuitry enables the driving mechanism in the preceding upstream zone of the conveyor to be disconnected rapidly and smoothly.

The instant sensor assembly includes a piston that moves within a cavity defined in the sensor bracket to extend a rod that raises or lowers the sensor roller. Upon movement of the sensor bracket the rod also operates an adjacent valve retained in a bracket secured to the frame of the conveyor. The valve is incorporated into the pneumatic circuitry for the preceding zone, and the valve operates a pneumatic actuator in the preceding zone. An endless chain extends between opposite ends of the conveyor, and the chain, when elevated, contacts, and drives, the rollers in the conveyor bed. Pneumatic actuators are located in each zone. Consequently, when the actuators are pressurized, the endless chain in the zone in question, is elevated and drives the rollers in that zone. The reverse is true, when the sources of pressurized air for each actuator is diverted, or bled to atmosphere, so that the actuator is retracted and power is removed from the conveyor rollers in that particular zone. The retraction of the actuator allows the endless belt to move away from the rollers in the zone under consideration.

The sequence of steps for operating the instant accumulating conveyor also represents a marked departure from known conveyors. For example, the proposed method calls for normally maintaining the roller assemblies in a depressed, or lowered position, beneath the level of the conveyor bed. A command to "prime", or raise, the sensing assemblies to operative position, is given only when necessary. Such method of operation contrasts starkly with the prior art technique of continuously maintaining the sensing assemblies, in primed or operative position, with the sensing element (usually a roller) extending above the plane of the conveyor bed.

Other significant advantages and advances realized by the instant accumulating conveyor, when contrasted with known accumulating conveyors, will become apparent from the ensuing description of the invention, when construed in harmony with the accompanying drawings,

BRIEF DESCRIPTION OF THE DRAWINGS

FIG. 6 is a vertical, cross-sectional view of a fragment of the accumulating conveyor, on an enlarged scale, such view being taken along lines 6—6 in FIG. 1 and in the direction indicated;

FIG. 9 is a top plan view of the length of drive chain over a fragment of the drive sprocket;

FIG. 10 is a vertical, cross-sectional view of the drive chain and a fragment of the drive sprocket about which the drive chain passes, such view being taken along line 10—10 in FIG. 9 and in the direction indicated;

FIG. 11 is a side elevational view of a few links in the drive chain;

FIG. 12 is a vertical, cross-sectional view of the drive chain, such view being taken along line 12—12 in FIG. 11 and in the direction indicated;

PIG. 13 is a top plan view of the fragment of drive chain shown in FIG. 11;

FIG. 14 is a bottom plan view of a pad that is engaged with the roller links of the drive chain;

FIG. 15 is a schematic view of one embodiment of the pneumatic circuitry employed by the accumulating conveyor of the instant invention;

FIG. 16A is a side elevational view of an upstream zone of the accumulating conveyor, with a portion of the drive chain cut away to show the lowered position assumed by the sensor roller assembly;

FIG. 16B is a similar, fragmentary view of the sensor roller assembly located downstream of the advancing item, such sensor roller assembly also being shown in its lowered position;

FIG. 17A is a side elevational view similar to FIG. 16A, showing the position assumed by the sensor roller assembly as an item travels thereover;

FIG. 17B is a view similar to FIG. 16B, but showing the primed position assumed by the sensor roller assembly prior to the arrival of the advancing item;

FIG. 18A is a side elevational view similar to FIG. 16A, but showing the elevated, sensing position assumed by the sensor roller assembly, and the drive chain in its lowered position;

FIG. 18B is a view similar to FIG. 16B, but showing the sensor roller assembly, in a downstream zone, being depressed as an article passes thereover;

FIG. 19A is a side elevational view similar to FIG. 16A, but showing the elevated, sensing position assumed by the sensor roller assembly, and the drive chain is in its lowered position;

FIG. 19B is a view similar to FIG. 16A, but showing the sensor roller assembly, in a downstream zone, being manually depressed.

Figure 23:
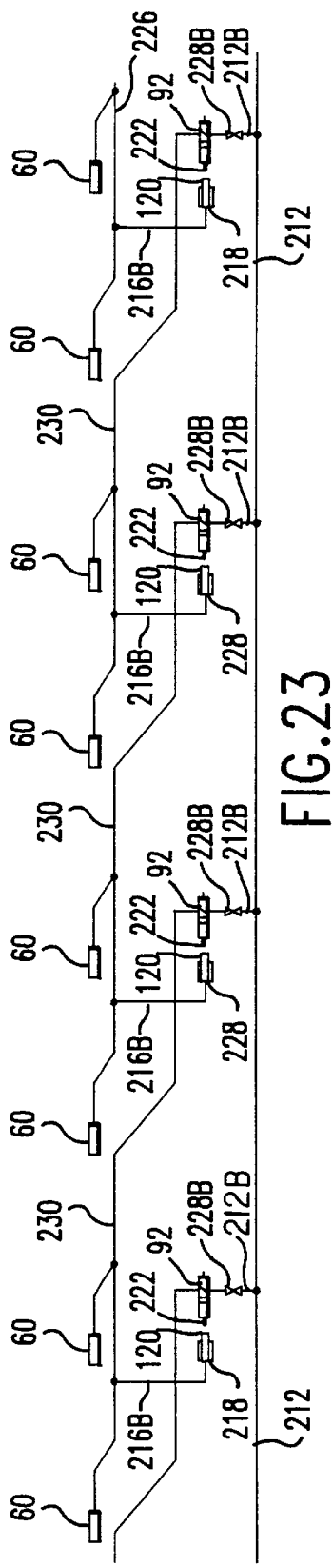
Figure 24:
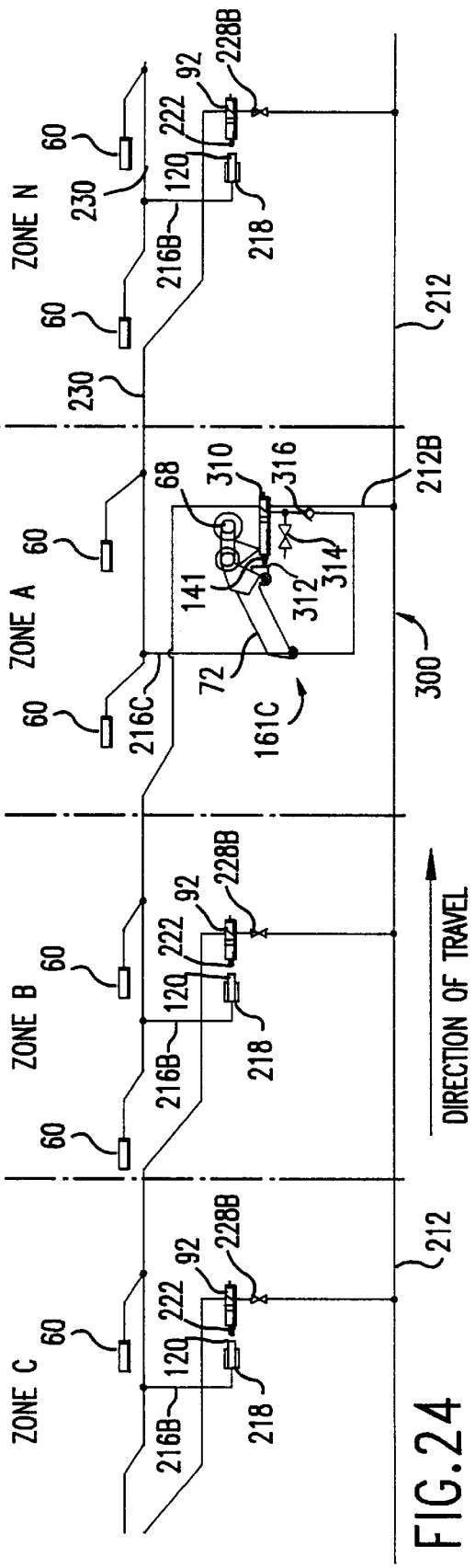
Figure 25:
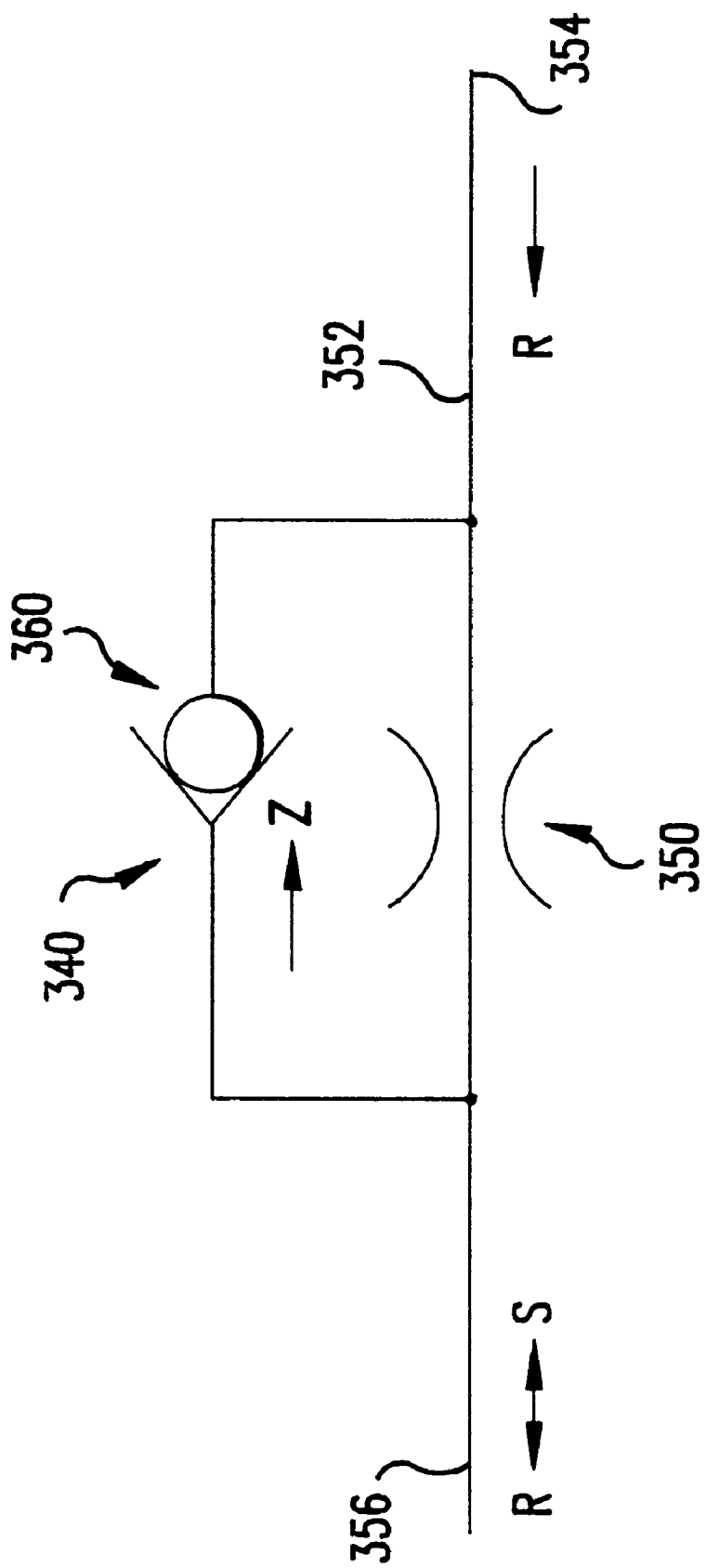

FIG. 20 is a perspective view of the underside of the pad shown in FIG. 15, such view being taken on an enlarged scale;

FIG. 21 is a schematic view of the pneumatic circuitry employed in a first alternative embodiment of the accumulating conveyor;

FIG. 22 is a schematic view of the pneumatic circuitry employed in a second alternative embodiment of the accumulating conveyor;

FIG. 23 is a schematic view of a preferred configuration of pneumatic circuitry for the conveyor of the instant invention;

FIG. 24 is another alternative configuration of pneumatic circuitry for the instant invention; and FIG. 25 shows an alternative restrictive orifice and check valve arrangement for use in the various pneumatic circuit arrangements of this invention.

DESCRIPTION OF PREFERRED EMBODIMENT

Figure 1:
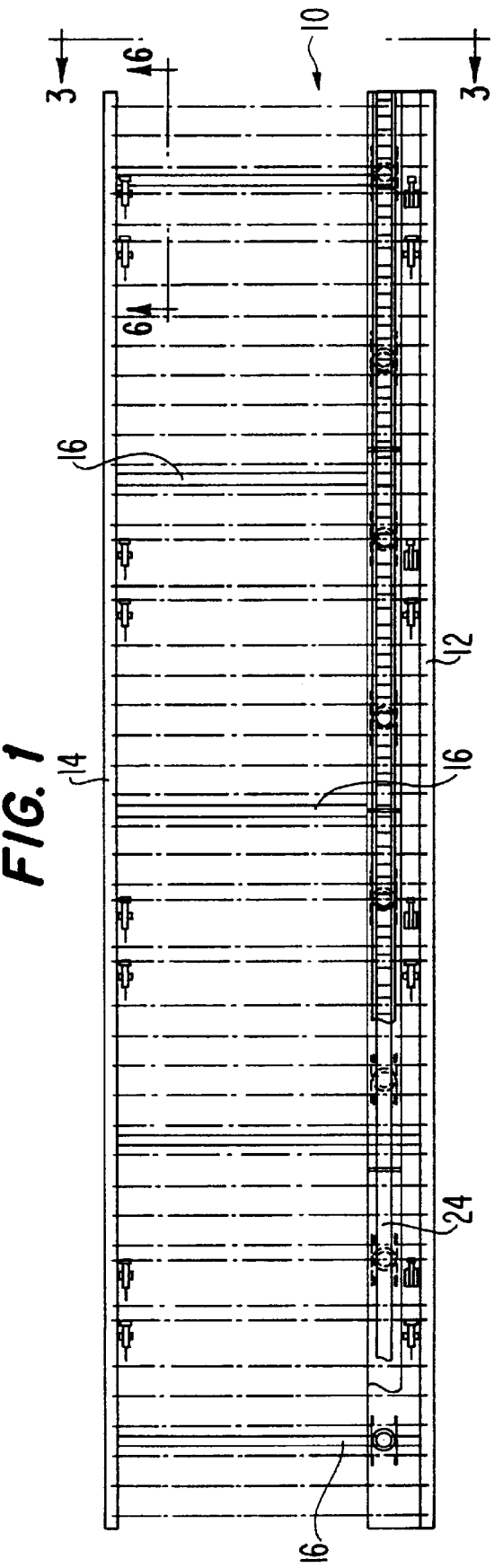
FIG. 1 is a top plan view of a portion of an accumulating conveyor constructed in accordance with the principles of the present invention.
Figure 2:
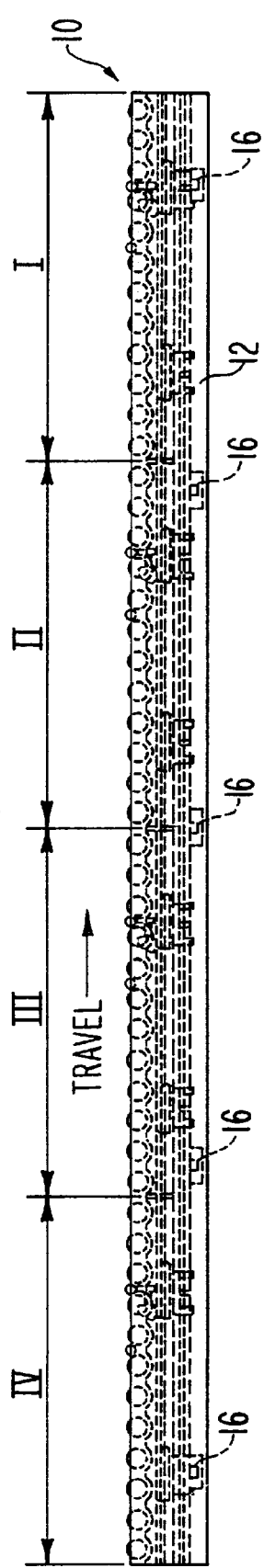
FIG. 2 is a side elevational view of the portion of the accumulating conveyor depicted in FIG. 1.
Figure 3:
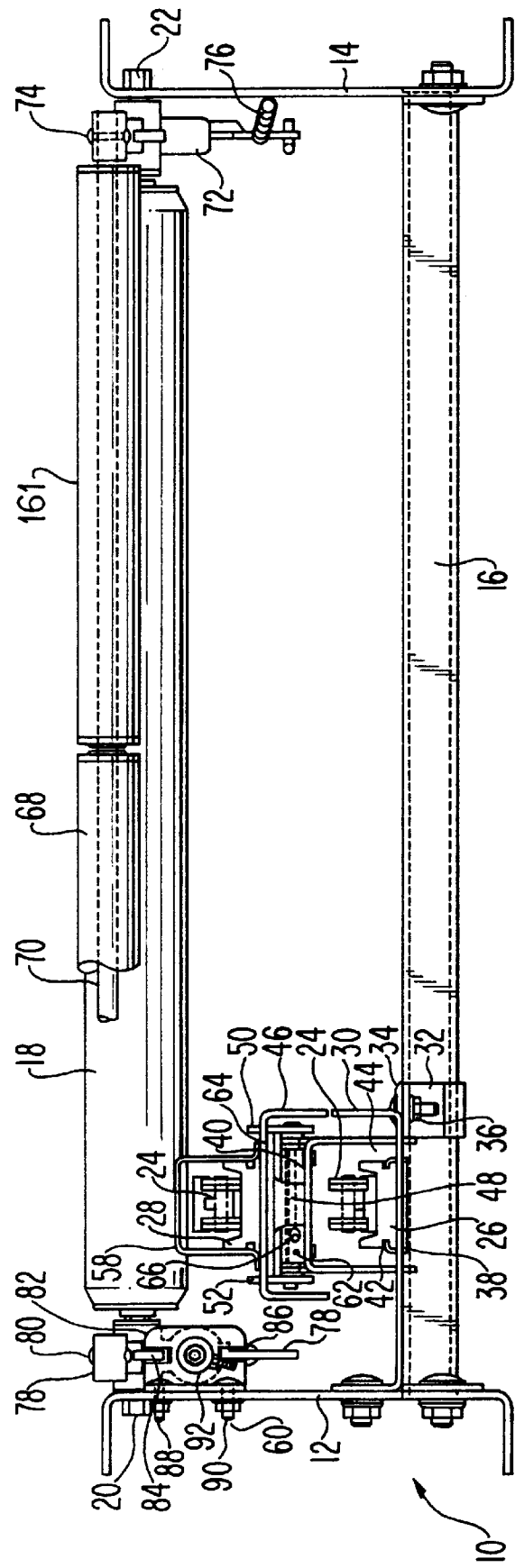
FIG. 3 is an end view of the accumulating conveyor, on an enlarged scale relative to FIGS. 1 and 2, such view being taken along line 3—3 in FIG. 1, and in the direction indicated.

FIGS. 1–3 show the overall organization of an accumulating conveyor 10 constructed in accordance with the principles of the present invention. Conveyor 10 includes a left side channel 12 and a right side channel 14 joined together by spreaders 16, located at regular intervals along the longitudinal axis of the conveyor and which with channels 12, 14 provide a support for cylindrical rollers 18. Spreaders 16 are rectangular in cross-section, as shown in FIG. 3, and impart structural rigidity to the conveyor. Conveyor 10 may extend a hundred feet or more, in length; however, the conveyor is divided into several zones. In FIG. 2, for example, the intermediate section of conveyor 10 is subdivided into zones I, II, III and IV, which may be nominally three feet in length. The nominal width of conveyor 10, as measured between channels 12 and 14, is 30 inches, as suggested in FIGS. 1 and 3.

Cylindrical rollers 18 extend across the width of conveyor 10. The rollers may be spaced on three-inch centers along the length of the bed, and are of uniform radial dimension, so that rollers 18 define a bed for the transport of items therealong. The center lines of the rollers are visible in FIG. 2, and spreaders 16 are also shown. As shown in FIG. 3, the ends 20, 22 of the central shaft of each roller 18 protrude beyond the ends of the cylindrical body. The ends fit into apertures defined in channels 12 and 14 to locate each roller in its position within the channels, as shown in FIG. 3. Each roller 18 rotates about its central shaft.

The cylindrical roller 18 retained in the sensor roller bracket assembly is foreshortened relative to those rollers defining the conveyor bed.

An endless drive chain 24 extends along the length of conveyor 10. An upwardly opening extrusion 26 receives the lower run of chain 24, while a second, upwardly opening extrusion 28 receives the upper run of endless chain 24. One leg of U-shaped control channel 30 is secured to channel 12 by bolts or other fasteners, while the base of channel 30 is secured to spreader 16 by fastening clip 32. A bolt 34 and nut 36 retains the clip 32 in fixed position, and a retainer 38 maintains the extrusion 26 in fixed position.

An inverted U-shaped housing 40 fits over the lower run of chain 24, and the depending legs of housing 40 fit through slots in channel 30. Ears 42, 44 project inwardly from the depending legs of housing 40 to contact extrusion 26. An inverted U-shaped lift channel 46 fits over housing 40, and is spaced therefrom by tab 48. Stabilizers 50, 52 keep lift channel 46 from shifting during lifting operations. A finger guard 58 fits over the upper run of chain 24.

A pneumatic actuator, indicated generally by reference numeral 60, is situated between the lift channel and housing 40. Actuator 60 comprises a cylindrical base 62, and an expansible bladder 64; pneumatic pressure is introduced into the actuator via a supply line connected to barb 66. When pressurized, bladder 64 expands and elevates lift channel 46 and finger guard 58, and the upper run of chain 24, relative to the rollers 18.

Figure 4:
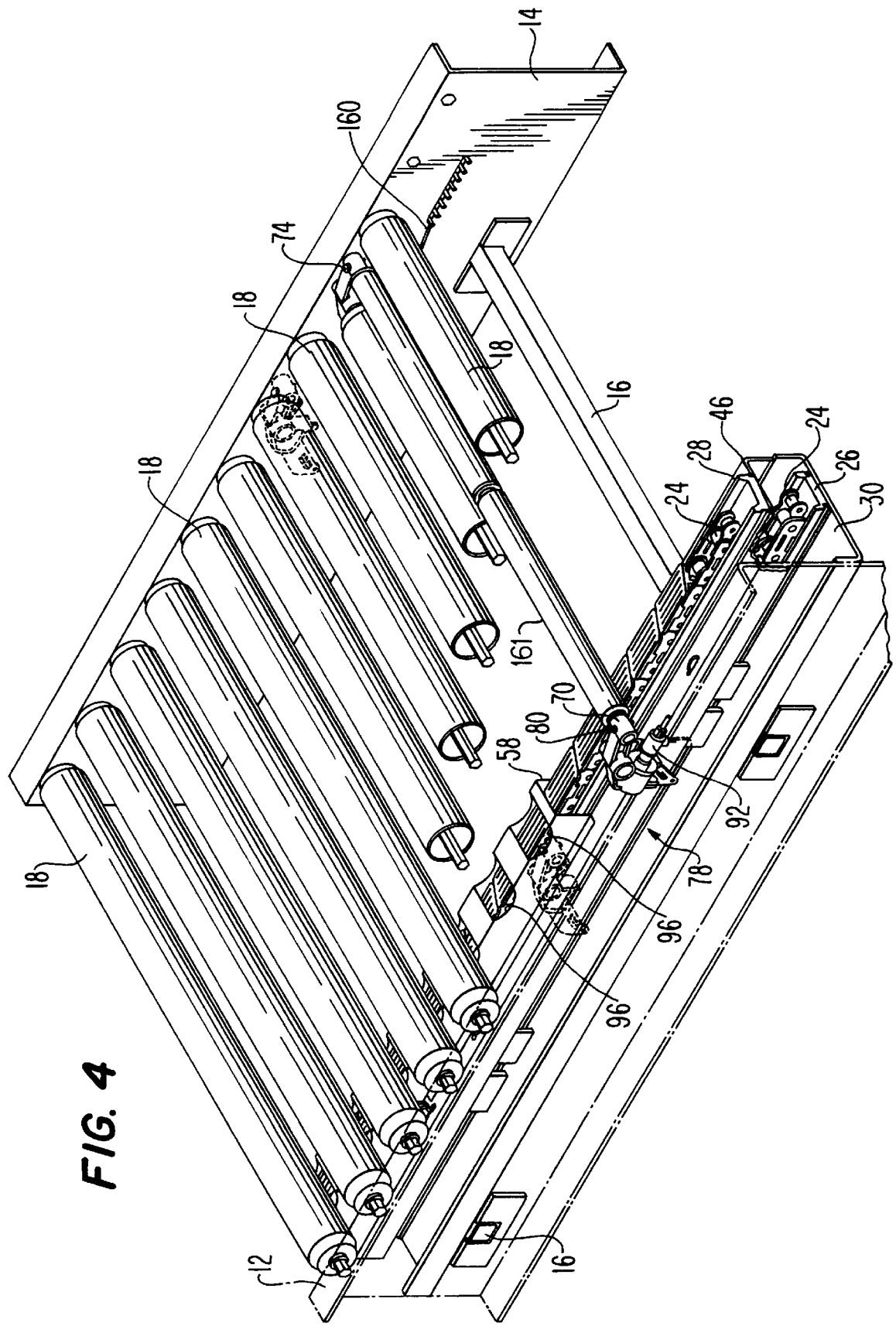
FIG. 4 is a perspective view of a portion of the accumulating conveyor of FIGS. 1–3, with fragments of the rollers broken away, to reveal, inter alia, a drive chain, a primary sensor bracket, a sensor roller, a valve operatively associated with the bracket, and a secondary sensor bracket.

FIGS. 3 and 4 (on an expanded scale) reveal that at least one sensor roller 68, with a unique bracket assembly for retaining same, is situated in each zone along the length of conveyor 10. Each sensor roller is somewhat less in diameter than rollers 18, and may be formed of two cylindrical sections joined together at the center line of the conveyor to the central shaft 70 that extends laterally through the sensor roller. Sensor roller 68 and central shaft 70 are joined together, and move in concert. Shaft 70 extends laterally between channels 12 and 14, but is not secured directly to either channel, and is mounted for movement relative thereto. The end of shaft 70 inboard of channel 14 is received in a secondary sensor roller bracket 72. A roll pin 74 is driven through the bracket and shaft 70 to join same together. A spring 76 is secured to bracket 72, while the other end of the spring is secured to channel 14 to establish a bias upon the bracket 72, and sensor roller secured therein.

The end of shaft 70 inboard of channel 12 is received in a primary sensor roll bracket 78 that is more sophisticated than unitary molded plastic bracket 72 (as will become apparent at a latter juncture in the description). A roll pin 80 is driven through bracket 78 and shaft 70 to join same together. An L-shaped valve mounting bracket 82, with cut-outs 84, 86, is secured to channel 12 by bolts 88, 90 adjacent to sensor roll bracket 78; a valve 92 is joined to the bracket. Lug 94 on bracket 78 fits within cut-out 84 so that the movement of bracket 78 may be aligned with valve 92 in bracket 82.

FIG. 4 is a perspective view of a zone of accumulating conveyor 10 with fragments of rollers 18 broken away to show the interrelationship of spreader 16 and channels 12 and 14; channel 12 is shown only in dotted outline to show details of the drive chain 24, lift channel 46, and other components that would otherwise be hidden from view. Portions of finger guard 58 are also broken away to show details of the drive chain 24, upper extrusion 28 for receiving chain 24, etc. Finger guard 58 has series of scalloped cut-outs 96 defined in its upper surface; one roller 18 fits into each opening, and the curved surface of the cut-out receives a roller. When lift channel 46 is in its unactuated, or lowered position, chain 24 passes freely a slight distance below the rollers. When lift channel 46 is elevated by the operation of a pneumatic actuator 60, the upper surface of chain 24 contacts the underside of rollers 18 and imparts a positive drive thereto.

Figure 5:
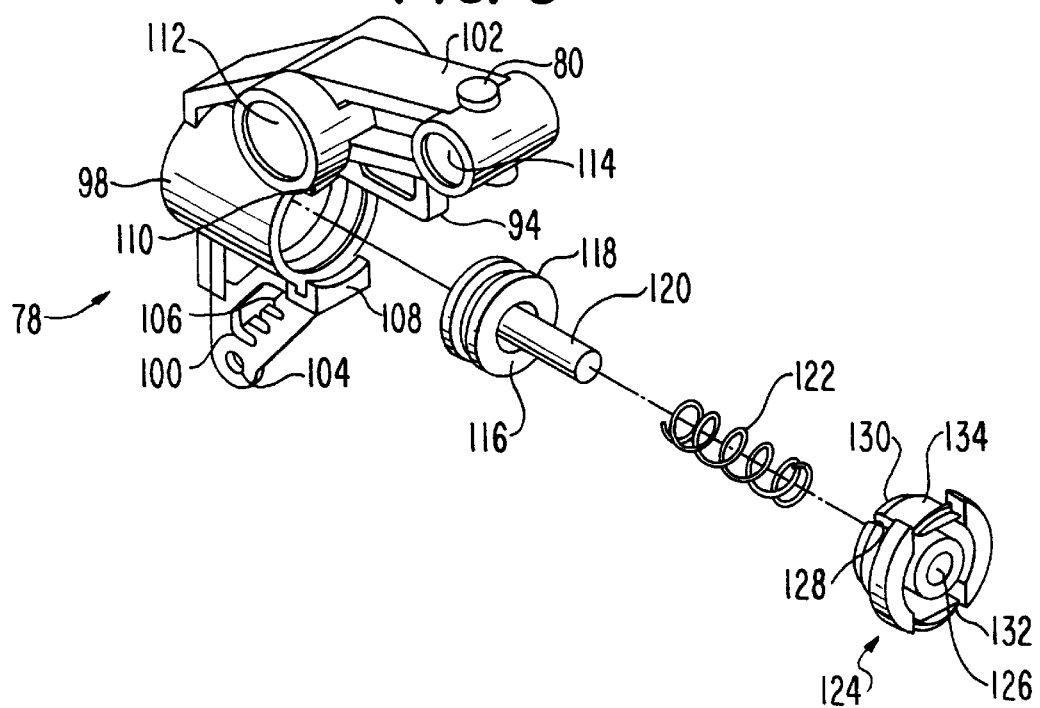
FIG. 5 is an exploded perspective view of the primary sensor bracket of FIG. 4, such view being taken on a greatly enlarged scale.

Primary sensor bracket 78 is shown in operative relationship to valve 92 adjacent channel 12; bracket 82, which supports valve 92, is shown in dotted outline in FIG. 4. The structural details of primary sensor roll bracket 78 are shown in FIG. 5, on an enlarged scale.

Bracket 78 comprises a unitary molded plastic body including a centrally located, outwardly opening body 98 of generally cylindrical shape, a depending leg 100, and an upwardly, and forwardly, extending arm 102. An opening 104 is formed through the leg 100, and a comb 106 is defined between the opening and the body 98.

Diametrically opposed seats 108, 110 are formed at the entrance to the body 98 of bracket 78. Cylindrical apertures 112, 114 are defined in arm 102, and lug 94 extends below arm 102. Aperture 112 receives the end 20 of a foreshortened roller 18, while aperture 114 receives the central shaft 70 of a sensing roller 68. Roll pin 80 is used to join the shaft 70, and sensing roller 68, to primary sensing bracket 78.

Body 98 of bracket 78 opens outwardly to receive a piston 116 with a seal 118 positioned about its perimeter, and an axially extending piston rod 120. A spring 122 fits about rod 120, and bears against piston retainer 124. Piston retainer 124 is a molded plastic component with an axial bore 126 passing therethrough; the bore is sized to receive the free end of piston rod 120. The body of the retainer is divided by longitudinal slits 128, and has a tapered entry surface 130, so that the retainer can be forced into the open end of body 98 against the urging of spring 122. The slits 128 allow arcuate segments 132, 134 to be flexed inwardly; once the retainer is seated within the bore in the cylindrical body 98, the fingers flex outwardly to engage with seats 108, 110 and the retainer is firmly seated within the body of bracket 78.

FIG. 6 shows the details of a secondary sensing bracket 72, which functions in concert with primary sensing bracket 78, and receives the opposite end of shaft 70 upon which sensing roller 68 is mounted. A pair of secondary sensing brackets may be joined together, to function in concert, within a single zone of the conveyor, for improved accuracy.

Examining secondary sensing bracket 72, which is located inboard of channel 14 and in alignment with primary sensing bracket 78, secondary sensing bracket 72 comprises a planar body 136, a depending leg 138, and an upwardly, and forwardly extending arm 140. An opening 142 is formed through the leg 138, and a comb 144 is defined between the opening and the body. Cylindrical apertures 146, 148 are defined in arm 140, and a lug 150 extends below arm 140.

A plastic bushing 152, with a hexagonal bore 154, is inserted into aperture 146 to receive the end 22 of the foreshortened roller 18. Roll pin 74 secures the sensor roller 68 within the aperture 148. A similar plastic bushing is used in the primary sensor bracket to receive the opposite end 20 of foreshortened roller 18.

Several notches 158 are cut through the channel 14, and a hook 160 is slipped into one of the notches. One end of spring 76 is slipped into engagement with hook 160, and the opposite end of spring 76 is engaged with one of the notches in comb 144 in the secondary bracket 72. The bias of spring 76 biases secondary bracket 72 counterclockwise, so that sensor roller 68 is positioned above the plane of the bed defined by rollers 18, as shown in FIG. 6. The sensitivity of the sensor assembly can be adjusted by shifting hook 160 laterally into engagement with a different notch, and/or by shifting spring 76 vertically into a different step in comb 144.

A sensor roller 68, plus its bracket assembly including primary bracket 78 and secondary bracket 72, usually function admirably and accurately as a sensor assembly 161 for detecting items passing thereover, and responding accordingly. However, when tote boxes with cut-out intermediate sections, or badly warped or twisted packages, pass along the conveyor bed, at high speeds, individual sensor rollers have occasionally been defeated or have misfunctioned. Consequently, to combat such extraordinary circumstances, longitudinally spaced and similarly mounted sensor rollers 68 are linked together by a rigid connecting rod 162. One end of the rod 162 fits into opening 142 in one secondary bracket 72, while the opposite end fits into opening 142 in an adjacent bracket 72.

Figure 7:
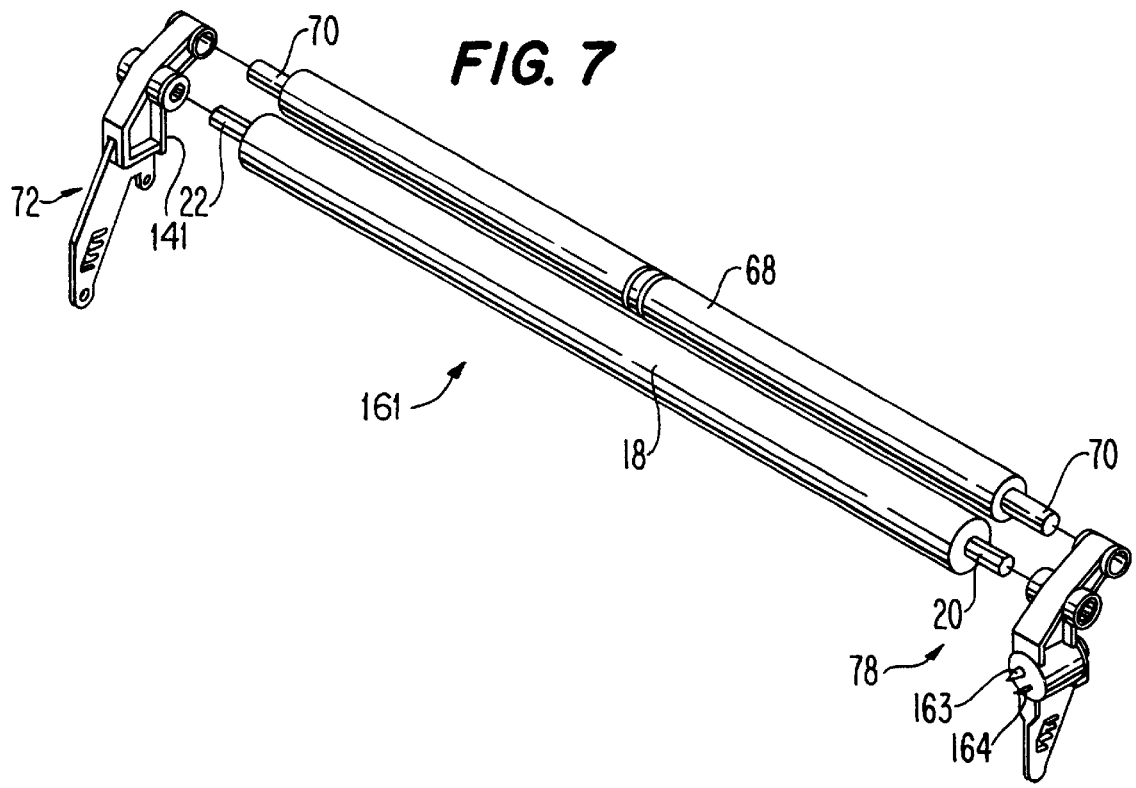
FIG. 7 is an exploded, perspective view of a sensor assembly including a sensor roller, a roller, a primary bracket, and a secondary bracket.

FIG. 7 shows, in an exploded perspective view, sensor roll assembly 161 comprising a primary sensor bracket 78, a secondary sensor bracket 72, a foreshortened roller 18 with projecting ends 20 and 22, and a sensor roller 68 retained upon shaft 70. A nipple 164 is visible on the rear surface of body 98 of primary sensor bracket 78. The nipple allows thin plastic tubing (not shown) to be slipped thereon, for purposes to be described at a later juncture in the specification. A protuberance 163 serves as a protective barrier for nipple 164, and prevents same from being snapped of f in transit, and/or in installation or during periodic maintenance.

Figure 8:
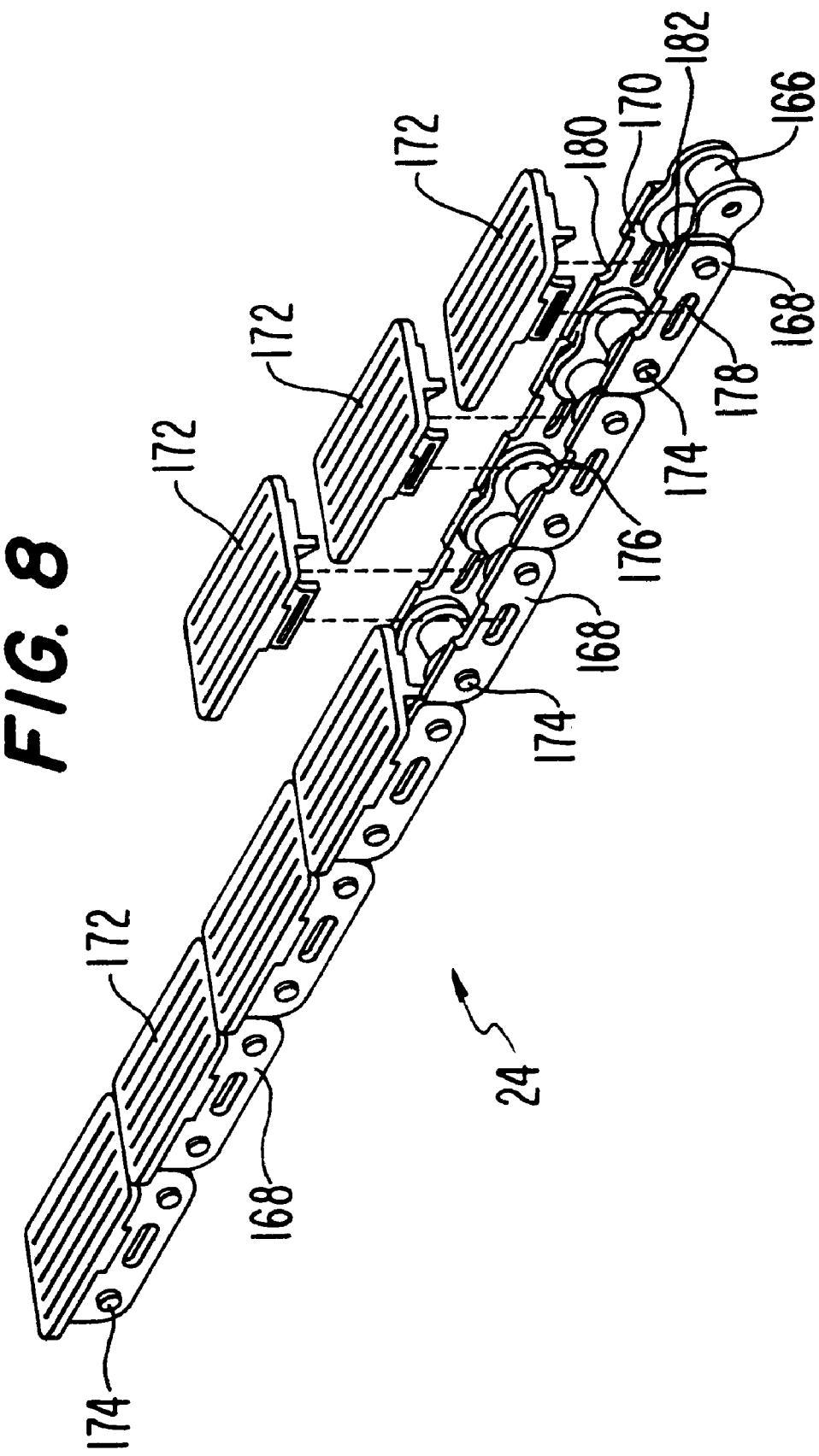
FIG. 8 is a perspective view of a length of the drive chain for the accumulating conveyor.

FIG. 8 depicts a length of endless chain 24 that selectively contacts rollers 18, and, when in contact, imparts rotational force thereto. Endless chain 24 includes standard roller chain links 166 retained between side plates 168, 170. Plastic drive pads 172 are snapped into locking engagement with side plates 168, 170. Some of the drive pads 172 in FIG. 8 are shown positioned above the side plates 168, 170, prior to being manually joined thereto. The parallelepiped shape of drive pads 172, when viewed from above, is shown in FIGS. 9 and 13.

Each pin 174 extends transversely through side plate 168, roller link 166, and plate 170, so that the roller may pivot relative to the side plates. A notch 176 is formed in the upper surface of side plate 168, and a slot 178 is formed below the notch, in vertical alignment. A matching notch 180 is formed in the upper surface of side plate 170, and a slot 182 is formed below the notch 180. The upper corners of the side plates are substantially square to provide additional support for the drive pads.

FIG. 9 shows that each drive pad 172, because of its parallelepiped configuration, extends over more than one pair of side plates 168, 170 and roller links 166. At least the leading edge of the parallelepiped extends a small distance over the preceding link in the endless chain; such shape reduces the chatter usually associated with rectangular drive pads on padded chains and also insures that contact with the rollers 18 can be maintained, at all times, when the rollers 18 are driven by the drive chain 24. Parallel grooves 184 are molded, or scored, in the drive surface of each drive pad 172 to enhance the contact area, and effectiveness, of pads 172 when such pads are engaged with rollers 18.

FIG. 10 shows the manner in which endless chain 24 engages the drive sprocket 186. The teeth 188 on the drive sprocket project upwardly between side plates 168, 170 and the roller links 166 fit into the valleys formed between adjacent teeth 188, so that the chain conforms to the curvature of the sprocket. An electrical motor 190, indicated schematically by reference numeral 190 rotates drive sprocket 186 to deliver rotational forces to rollers 18, when the drive chain is elevated into contact with the rollers. A gear reducer (not shown) may be interposed between motor 190 and the shaft upon which the sprocket is secured. Drive sprocket 186 is located at the inlet, or head end, of the accumulating conveyor. A similar sprocket (not shown) is located at the tail, or discharge end, of the conveyor; thus, the endless chain 24 extends the length of the conveyor in an upper run, and a lower, parallel, run.

FIGS. 11–13 show the manner in which each drive pad 172 is snapped into engagement with the side plates 168, 170 of the endless chain 24, while FIGS. 14 and 20 show the underside of a drive pad 172. Each drive pad 172 is a unitary molded plastic component, including a planar drive surface with grooves 184, and a pair of tongues 192, 194 spaced inwardly from the sides of the drive pad. Tongues 192, 194 fit between side plates 168, 170, and outwardly projecting lugs 196, 198 are formed at the lower end of the tongues. A first projection 200 is formed adjacent one side of drive pad 172, and a second, identical projection 202 is formed adjacent the other side.

Arcuate saddles 204, 206 are formed near one edge of the drive pad, along its underside, while arcuate saddles 208, 210 are formed near the other edge of the drive pad. Each drive pad 172 is pressed downwardly into seating engagement with the side plates 168, 170 of the endless chain 24. Thus, tongues 192, 194 are pressed downwardly until projecting lugs 196, 198 flex outwardly into slots 178, 182; projections 200, 202 fit into notches 176, 180 in the side plates. Saddles 204, 206 and saddles 208, 210 fit about the roller links retained between side plates 168, 170. The tongues, lugs, projections, seats, etc. are molded within close tolerances so that the drive links can readily be snapped into engagement with the endless chain, and can be removed therefrom, for replacement, as necessary.

FIG. 15 schematically shows a pneumatic circuit for accumulating conveyor 10. The circuit extends the length of the conveyor, although only four zones are shown, starting with the discharge zone, and traveling upstream, including zones A, B, and C. Pressurized air, such as may be found in an air line in a shop or factory, or may be supplied from a compressor, is introduced into line 212, and pressurizes the entire line, throughout all zones. Valves 92 are normally biased closed by internal springs 214, and in that disposition: their associated actuators 60 are isolated from the pressurized air in line 212; lift channels 46 operated by such associated actuators 60 would be lowered moving pads 172 of the upper run of chain 24 away from rollers 18 and thus removing drive power away from such rollers 18. But, in the quiescent condition of conveyor 10, the action of springs 76 (FIGS. 3 and 6) rock brackets 72 and sensing assemblies 161, in the counterclockwise direction about the axis of rotation of their respective associated rollers 18, moving primary sensor brackets 78 (FIGS. 3 and 4), for all zones, to the positions shown therefore in FIG. 18A wherein the ends of piston rods 120 (FIG. 5) are in contact with buttons 222 to operate valves 92 into their respective valve open conditions, and moving sensor rollers 68 to their respective dispositions above the transport bed defined by rollers 18. Thus, air pressurizing line 212 will pressurize all zones [except the discharge zone (FIG. 15) as will be hereinafter explained] passing through open valves 92 to operate actuators 60 and passing over lines 216 to flow into and fill bores 218 of brackets 78. Operation of actuators 60 lifts channels 46 moving pads 172 of the upper run of chain 24 into contact with rollers 18 and, if chain 24 is driven, driving rollers 18 and any packages carried thereby. Air filling bores 218 effects a clockwise rotation of primary sensor bracket 78 and sensor assembly 161 against the action of spring 76 and about the axis of rotation of associated roller 18 (FIGS. 16A, 16B and 18A) moving sensor rollers 68 from their disposition raised above the transport bed defined by rollers 18 to a disposition either at or below said transport bed; except for the discharge zone because air pressurizing line 212 has no access to bore 218 in the discharge zone except through a valve 224.

Actuators 60 in the discharge zone are not raised when line 212 is pressurized with air and rollers 18 associated therewith are not driven if control 224, disposed in line 212, is in its closed disposition. However, when external control 224 is operated, air travels over line 226 and through a Y-connection 227 to actuators 60 in the discharge zone. The air operates actuators 60 which raise lift channel 46 to place pads 172 of the upper run of drive chain 24 in contact with rollers 18 to empower same.

The air passing through control 224 also passes through branch line 216 and pressurizes the bore 218 in primary sensor roller bracket 78 of the discharge zone, pivoting its bracket 78, sensor assembly 161 and its sensor roller 68, in the clockwise direction lowering sensor discharge zone roller 68 from its disposition above the transport bed (FIG. 17B) to its disposition at or below the transport bed (FIG. 16B).

During an accumulation cycle of operation of conveyor 10, to be hereinafter explained in greater detail, air is exhausted from all actuators 60, successively zone by zone from the discharge zone through zones A, B, C, etc, lowering lift channels 46, and pads 172 to remove the drive from rollers 18. Air is also exhausted from bores 218 permitting springs 76 to rock brackets 72 and sensing assemblies 161 in the counterclockwise direction but because packages are disposed on the transport bed defined by rollers 18 such counterclockwise rocking of sensing assemblies 161 will be arrested when their respective sensor rollers 68 abut beneath a package as shown in FIG. 18B. Upon appropriate operation of control 224 air over line 226 operates actuators 60 and enters bore 218 of sensor assembly 161, of the discharge zone. Actuators 60 raise pads 172 of chain 24 into contact with rollers 18 of the discharge zone which then start to move the package disposed thereat off of its sensor roller 68. In one control configuration before a package moves off of roller 68 air filling bore 218 in the discharge zone moves its piston 120 into contact with button 222 of the normally closed valve 92 to open same. The opening movement of valve 92 allows the pressurized air in line 212 to flow through valve 92 into the branch line for the next upstream zone to operate actuators 60 and piston 116 associated with such zone. Actuators 60, as shown in FIGS. 3 and FIGS. 16A, 17A, 18A and 19A, elevate the lift channel for the endless chain 24 in the selected zone, and drive pads 172 on chains 24 are pressed into engagement with the undersides of rollers 18 in such zone to drive rollers 18 and move any packages disposed thereon towards the discharge end of conveyor 10. Operation of piston rod 120 moves its end into engagement with valve 92 for the next zone to operate valve 92 and permit air from line 212 to pass through. In the schematic circuit of FIG. 15, the opening of valve 92 in the discharge zone, thus enables operation of actuators 60, piston rod 120 and valve 92 in zone A; the opening of valve 92 in zone A enables operation of actuators 60, piston rod 120 and valve 92 in zone B. The actuators 60 and piston rods 120 for each zone are operated in a particular, step-by-step fashion, starting from the discharge end of the accumulating conveyor, and moving serially, or zone-by-zone, toward the inlet, or head end, of the conveyor. When air enters bore 218 for any zone, including the discharge zone, it may, after moving the end of its piston rod 120 into contact with button 222 of its associated valve 92, also effect a further clockwise rotation of sensor assembly 161 lowering its sensor roller 68 to, or below, the bed of rollers 18 depending upon the relative size and configuration of the respective parts of assembly 161.

CYCLE OF OPERATION

Specific structural components and subcombinations of a preferred embodiment accumulating conveyor 10 have been illustrated in FIGS. 1–15, and described in detail in the specification. However, FIGS. 16A–19B, inclusive, correlate the various subcombinations and components of the accumulating conveyor, by describing a cycle of operation for the accumulating conveyor.

Sensor assembly 161 for each zone of accumulating conveyor 10 includes a sensor roller 68 which is deflected, or depressed, by articles passing thereover, as shown in FIG. 18B. Primary sensor bracket 78 and secondary sensor roller bracket 72 position sensor roller 68 relative to cylindrical rollers 18 that define the bed of the conveyor 10. Brackets 78 also transmit the pivotal motion, or deflection, of sensor roller 68 to valve 92, which is positioned adjacent to the primary sensor bracket 78, in each zone. Spring 76 biases sensor roller 68 to its operating, or primed, position slightly above the plane of the bed of the conveyor. The force of spring 76 also pivots primary sensor bracket 78 so that piston rod 120 maintains pressure upon button 222 of control valve 92, in selected positions of bracket 78.

While FIG. 5 shows the components of primary sensor bracket 78 in an exploded perspective view, FIG. 16A depicts the components in an assembled, operative condition. Bracket 78 has a cylindrical body 98 and piston retainer 124 is seated at the open end of the bore 218 in the cylindrical body. Piston 116 can be driven within bore 218, so that piston rod 120 projects outwardly through the bore 126 in retainer 124. Spring 122, which is received in retainer 124 and fits about the piston rod 120, urges piston 116 against a rear wall of bore 218 and resists the movement of the piston and piston rod 120 towards retainer 124. Seal 118 on the periphery of the piston contacts the inner surface of the bore 218, and contains the fluid pressure in the bore.

Nipple 164 opens into bore 218. An end of air line 216 (see FIG. 15) is shown slipped over nipple 164, for such line 216 delivers fluid pressure to bore 218 to move piston 116 against the opposing force of spring 122.

Valve 92 is a three way valve with an exhaust port to atmosphere and with inlet and outlet ports. A spring 214, which is shown schematically in FIG. 15, is located within the valve housing. Button 222 projects laterally from valve 92 toward primary sensor roll bracket 78, and the free end of piston rod 120 is disposed to contact button 222. Button 222 is biased outwardly from the body of valve 92 by internal spring 214. Button 222 is retained on the free end of a stem extending laterally through the body of valve 92. The travel of button 222 and its stem is but a few hundredths of an inch. Thus when button 222 is moved against the bias of spring 214, as it would be when in contact with the end of piston rod 120, air may pass from line 212 through the inlet and outlet ports of valve 92 to lines 230 and 216; and when button 222 is not in contact with piston rod 120, spring 214 closes off the inlet and outlet ports and connects the outlet port to the exhaust port to thus vent lines to the atmosphere through valve 92. A suitable low contact pressure type valve, requiring minimal movement for actuation, is available from Clippard Valve Co. of Cincinnati, Ohio, and is further identified as Clippard #CS-959.

When pressure is introduced from an air line 216 into a bore 218 via its nipple 164, it may either: move piston 116 to overcome spring 122 and push the free end of piston rod 120 against button 222 (thus moving from its FIG. 18B disposition to its FIG. 16B disposition); or, if the end of piston rod 120 is already positioned against button 222 (as shown in FIG. 17B), effect a rocking of sensor assembly 161, in the clockwise direction. Bushing 152 serves as the axis of rotation for brackets 72, 78, and sensor roller 68 retained therein. Thus, the sensor assembly 161 rotates clockwise to position its sensor roller 168 in a "lowered" position at, or below, the operating plane of the bed of the conveyor rollers 18. Such position is shown in FIGS. 16A and 16B.

Nipple 164 at the rear of the body 98 of primary sensor roller bracket 78 is connected to the air line 216 leading to the pneumatic actuators 60 in the same zone in which the sensor roller bracket assembly 161 and its piston rod 120 are physically located. Each air line 230 extends from a valve 92 disposed in the pneumatic circuit for a particular zone but which is physically located so that its actuating button 222 is disposed for coaction with the sensor assembly 161 and its piston rod 120 of the adjacent downstream zone.

When an accumulation operation is initiated, air pressure is bled off at the last, or discharge, zone, by an external control 224 (shown in FIG. 15). Such external control may assume the form of a solenoid valve with suitable inlet and outlet ports and an exhaust to atmosphere to permit bleeding of line 226 and bore 218 of the discharge zone. This venting of air allows the bladders 64 of pneumatic actuators 60 in only the discharge zone to retract and permit lift channel 46, with the upper run of endless drive chain 24, to move out of engagement with the underside of rollers 18, so that the rollers 18 of the discharge zone are no longer driven. Also, venting the pressure in bore 218 in primary sensor roller bracket 78 of the discharge zone forces the piston rod 120 to retract into the bore 98 under the urging of spring 122 and load spring 76 as load spring 76, connected to secondary sensor roller bracket 72, causes the brackets 72, 78, and the sensor roller 68 retained therein, to rotate counterclockwise about the axis of the associated roller 18 (also retained within brackets 72, 78), thus raising, or priming, the sensor roller 68 to a position above the operating plane of the bed of the conveyor defined by rollers 18. The primed position of sensing roller 68 is shown in FIG. 17B, 18A, and 19A, for example.

Sensor roller 68, when in its raised or primed position, may be depressed by an item, or article, being conveyed along the bed of the conveyor, as shown in FIG. 18B.

Alternatively, when it is necessary to check the operation of the sensor roller for maintenance purposes and the like, the sensor roller may be manually depressed, as shown in FIG. 19B. In either instance, such depression of sensor roller 68 rocks its sensor assembly 161 in the clockwise direction, moving the end of its piston rod 120 away from button 222 operating valve 92 to its closed disposition, not only to cut-off air to that zone through its valve 92, but also to permit exhaust of air from actuators 60 in that zone and bore 218 of its sensor assembly 161 through its valve 92. The cutting off of air pressure to the preceding upstream zone, and the exhaust of air therein to atmosphere through valve 92, thereby allows pneumatic actuators 60 for that zone to lower lift channel 46 moving upper run of drive chain 24 away from driving engagement with rollers 18; and causes piston 116 in primary sensor roller bracket 78 for that zone to be retracted into bore 218 so that the sensor roller 68 in that zone, pivots into its raised, or primed, condition, above the operating plane of rollers 18. This process continues serially, zone by zone, up the accumulating conveyor 10 until the conveyor fills up, or release of the items or articles begins at the discharge end.

To release the items retained on the accumulating conveyor, external control 224 (shown in FIG. 15) is operated and air pressure is supplied over line 226 to the pneumatic actuators 60 in the discharge zone; the actuators elevate the related lift channel 46 and bring drive chain 24 into driving relationship with rollers 18 in the discharge zone. The air pressure supplied over line 226 also pressurizes branch line 216 which communicates with bore 218 in the body of the primary sensor roller bracket 78. The pressurization of bore 218 forces piston rod 120 to project into contact with button 222 on adjacent valve 92 to operate and open valve 92. The further entry of air and contact between rod 120 and button 222 may also cause sensor roller 68 to pivot further downwardly, or clockwise, to assume a "lowered state" below the operating plane of the bed of conveyor rollers 18. Valve 92, in the discharge zone, is actuated when the button 222 is forced laterally toward the body of the valve against the opposing force of spring 214. The normally closed valve 92 is thus opened, and the pressurized flow in line 212 passes through the valve and into the pair of actuators 60 in the preceding zone (Zone A in FIG. 15). Actuators 60 then elevate lift channel 46 and bring the endless drive chain 24 into driving engagement with rollers 18 in Zone A. The pressurized flow in line 212 also reaches bore 218 in the primary sensor roller bracket in Zone A, and forces the piston rod 120 in such bore into contact with button 222 of valve 92 in Zone A. Valve 92 in Zone A is then forced open, and pressurized flow through line 212 reaches the preceding zone (Zone B in FIG. 15) to repeat the process, once again. An orifice 228 in the branch line 216 leading to the bore 218 in each primary sensor roller bracket 78 in the pneumatic circuit configuration of FIG. 15 retards the action of piston 116 and piston rod 120; the orifice adjusts the spacing between adjacent package items for optimum results. In such fashion, the entire accumulating conveyor may be engaged with the drive chain 24, in a serial, zone-by-zone, fashion, proceeding, at appropriately timed intervals, upstream from the discharge end of the conveyor to the inlet end.

The foregoing description of the operation of accumulating conveyor 10 describes the so-called "singulation" technique for discharging items, one at a time, from conveyor 10. The conveyor may be operated at such a high rate of speed that the space permitted between individual items is reduced so that discharged items almost contact one another.

Conveyor 10 may be operated continuously, if so desired, in the non-accumulating mode, wherein drive chain 24 positively engages the conveyor rollers 18 in each and every zone along the run of the conveyor. The pressurization of actuators 60 elevates the sections of lift channel 46 in each zone, and drive chain 24 contacts the underside of each conveyor roller 18. The pressurization of the system also flows through branch lines 216 into the bores 218 in each primary sensor roller bracket 78; pistons 116 and piston rods 120 engage buttons 222 of adjacent valves 92. Sensor rollers 68; and the brackets 72, 78 retaining same; pivot clockwise downwardly to, or preferably below, the plane of the bed of conveyor rollers 18. In this "lowered" position, the articles passing down the bed either pass over the sensor rollers without depressing same, or just lightly skim over same.

In either case, sensor rollers 68 do not change the state (usually opened) of adjacent valves 92, so that the drive mechanisms for the preceding zone is not operated, as is customary with known accumulating conveyors. A relatively small amount of air is necessary to maintain the sensor rollers 68, and related brackets 72, 78, in each zone, in lowered condition. Thus, the demands of the accumulating conveyor can easily be satisfied by low pressure, low volume air lines usually found in factories, warehouses, work shops, and the like. Since the sensor rollers 68 are not contacted and/or depressed during most cycles of operation, the accumulating conveyor functions with a minimum of noise. Consequently, accumulating conveyor 10 can maintain the desired spacing, or intervals, between items traveling therealong, and can function at a level of efficiency not previously realized.

While the operation of accumulating conveyor 10 was designed for use in a "singulation" mode of operation, conveyor 10 could also be reconfigured to operate in a "slug" release mode. "Slug" release could be achieved by pressurizing a common exhaust line in the pneumatic circuit for the conveyor, or an auxiliary, release line can be furnished to link one zone in each section of the accumulator. This alternative pneumatic circuit would provide a safeguard against component failure along the run of the conveyor.

On slow speed, on line-shaft style accumulating conveyors, such as disclosed in U.S. Pat. No. 3,840,110, granted on Oct. 8, 1974 to R. P. Molt et al, the product must be driven, under power, to the sensor roller 68 (mounted within brackets 72 and 78) for coaction with valve 92 in the zone in which accumulation will occur. FIG. 21 schematically shows a pneumatic circuit adapted for utilization with such a line-shaft accumulating conveyor. The circuit of FIG. 21 differs from the circuit of FIG. 15 in that valve 92 (which may also be designated as a control valve) is connected to actuators 60 in the same zone that the valve is located in, and that line 212 is also connected to piston 116 of the next upstream sensor roller. By virtue of this pneumatic circuitry, during accumulation, the power to the rollers of the zone is maintained until the sensor roller in that particular zone is depressed. A restricting orifice 228 is positioned in the air line to each piston 116 to control the action of piston 116 as described hereinabove with reference to FIG. 15.

FIG. 22 schematically shows an additional pneumatic circuit that allows for several starting points of accumulation. A potential problem of the normally down sensor accumulation method (shown in FIGS. 1–7 and 16A–19B) may occur when a sensor roller and related valve 92 fail to disengage the upstream zone. On long runs of accumulation the whole line could remain live roller (not accumulating). To cure this problem the conveyor could be divided into smaller groups of zones, controlled by a secondary air line 226A, which allows the first sensor in each group of zones to initiate accumulation or release. In such a configuration bore(s) 218A of the selected sensor assembly(s) 161A would be connected to secondary airline 226A instead of through lines 216 to lines 230. Upon closing of control 224 air would be exhausted from bores 218A and springs 76 would rock sensor assemblies 161A counterclockwise to raise their sensor rollers 68A above the bed of conveyor rollers 18. Thereafter such raised sensor rollers 68A would be able to each initiate accumulation as described above. It should be noted that a restricting orifice 228 is disposed in each line 216 leading to (and from) bore 218 in a manner similar to and for reasons described above with reference to FIGS. 15 and 21; but that no such restricting orifice is shown as provided in lines 216A leading from secondary line 226A to bore(s) 218A of sensor assembly(s) 161A. However one or more restricting orifices may, if desired, be disposed in said lines 216A and/or 226A.

In another alternative, and preferable pneumatic circuit configuration, as shown in FIG. 23, actuators 60, arranged in at least pairs for each conveyor zone, receive air through lines 230 which are, in turn, supplied air from line 212 through valves 92 each disposed for coaction with a piston rod 120 of a sensor assembly 161 of the adjacent downstream conveyor zone-all as described hereinabove with reference to FIG. 15. Discharge zone actuators 60 would receive air from line 226 through a control valve, such as valve 224 of FIG. 15, also as described for FIG. 15 hereinabove. Bores 218 for the respective pistons 116 and piston rods 120 disposed to coact with buttons 222 of valves 92, however, in the FIG. 23 pneumatic circuit configuration, are pneumatically connected to lines 230 (and 226 for the discharge zone) through pneumatic lines 216B within which there is no restrictive orifice, (such as orifice 228 in line 216 of FIG.15). Instead an orifice 228B is disposed in each one of a plurality of pneumatic lines 212B each leading off of line 212 and extending to an inlet port of a respective valve 92. This disposition of restrictive orifice 228B retards the action, or flow, of air from line 212 to each valve 92 but does not retard the action, or flow, of air exhausting from bores 218 and actuators 60 through lines 230 (226 for the discharge zone) through their respective exhaust ports to atmosphere of their respective valves 92, as would occur for bores 218 exhausting through orifices 228 of the FIG. 15 pneumatic circuit configuration.

Where there is no restrictive orifice in the pneumatic lines to bores 218 (as shown for the pneumatic circuit of FIG. 23) and also for valves 92 (as shown for the pneumatic circuit of FIGS. 15, 21 and 22) which is also a possible pneumatic circuit configuration: air from the respective pneumatic lines passes through valves 92 and into actuators 60 and bores 218 without restriction (except for that encountered in the lines and valve 92) and enters to actuators 60 and bores 218; and air exhausts from actuators 60 and bores 218 through the exhaust-to-atmosphere port of valves 92 (as described hereinabove with reference to FIG. 15) also without restriction and generally as quickly as the air entered these devices. During an accumulation cycle, when the supply of air to successive upstream zones is cut-off there is a reasonably good accumulation response time with this pneumatic circuit configuration. When packages so accumulated are released the respective zones cycle relatively quickly and the spacing between successive packages fed out of accumulation can be relatively small with little if any gaps therebetween.

With restrictive orifice 228 in lines 216 between lines 230 (226 for the discharge zone) and bores 218 of sensor assemblies 161 (as shown in the FIG. 15 pneumatic circuit configuration): the air flow to bores 218 is retarded; and the exhaust of air from bores 218 is also retarded. During an accumulation cycle the retarded exhaustion of air from bores 218 in successive upstream zones results in a somewhat retarded raising of sensor rollers 68 in each successive upstream zone and, accordingly, a somewhat retarded accumulation in comparison to what the cycle might be if there were no restrictive orifices 228 in the line between actuators 60 and bores 218. When packages so accumulated are released the retarded operation of successive sensor assemblies 161 and their associated valves 92 results in a gap or a relatively larger gap, between successive packages being fed out of accumulation by successively powered conveyor rollers 18 than would occur if there were no restrictive orifice 228 in the line between bores 218 and valves 92.

With restrictive orifices 228B in the pneumatic lines 212B between line 212 and valves 92 (as shown in the FIG. 23 preferred pneumatic circuit configuration): the air flow from line 212 to bores 218 by way of lines 216B, 230 and valves 92 is retarded by disposition of restrictive orifices 228B on the air inlet to valves 92; however, the exhaust of air from bores 218 through the exhaust-to-atmosphere port of valve 92 is not so retarded. The successive upstream zones cycle relatively quickly during an accumulation cycle because there is no retardation of the exhaustion of air from successive bores 218 and accordingly no retardation of the rocking action of each successive upstream zone sensor assembly 161 to release button 222 of its associated valve 92 to cut-off the air supply to the next successive upstream zone. The successive supply of air through valves 92 for each successive upstream zone, when packages are to be fed from conveyors 10 after being so accumulated is, however, retarded by the disposition of restrictive orifices 228B in line 212B leading to the inlet ports to valves 92 and results in controlled and relatively better gap spacing between products being moved by conveyer 10. Thus the so restricted air flow causes actuators 60 to fill at a reduced rate of speed to, in turn, move pads 172 of chain 24 into engagement with and to drive conveyor rollers 18 and packages carried thereby. This retarded action allows for a relatively greater spacing between packages leaving successive zones upon release of the accumulated packages and thus provides for a sequential release. Conversely when accumulations is initiated, or re-initiated if only some of the accumulated packages are released, lines 230 (226 for the discharge zone) and bores 218 are vented to atmosphere without restriction (except any which may otherwise occur in the lines and in valves 92). Therefore, the release of air pressure is relatively immediate and movement of successive sensor rollers 68 to their raised positions is relatively rapid, allowing for effective zero pressure accumulation of closely spaced items at relatively rapid travel rates. Should only a portion of the packages accumulated be so fed then re-institution of accumulation does not adversely affect zero pressure accumulation and re-institution of package feed of all or part of the packages so re-accumulated will also maintain a package spacing better then that obtainable with the FIG. 15 pneumatic circuit configuration or than would be obtained with no orifices in the pneumatic circuits to either bores 218 or valves 92. In fact the disposition of orifices 228B between air line 212 and the inlet ports to valve 92 minimizes and possibly relieves back pressure in the line of accumulated packages that might occur with the other pneumatic circuit configuration described above during successive operations of releasing and re-releasing some of the accumulated packages.

In utilizing a restrictive orifice 228B in a disposition leading to the inlet port to valve 92 it is also possible to utilize a relatively larger orifice then one which would have to be disposed in line 216 between line 230 and bores 218. The relatively larger orifice so used would be easier to maintain as it would not clog-up as easy as a relatively smaller orifice might. Such relatively larger orifice 228B might be in the range between 0.005 to 0.050 inches and might reasonably be 0.022 inches; while the smaller orifice 228 might be in the range between 0.003 inches to 0.030 inches with 0.007 inches the preferable size.

FIG. 24 shows yet another pneumatic circuit configuration that is an alternative to and preferable to that shown in and described in FIG. 22. The pneumatic circuit configuration of FIG. 24 provide a jam prevention assembly or fuse 300 for conveyer 10 and includes a modified sensor assembly 161C and a cooperating valve assembly 310 which can be located in any one or more of the intermediate zones between the head end of conveyor 10 and its discharge end. Preferably a jam prevention assembly or "fuse" 300 might be located about 24 feet apart along the length of conveyor 10. The purpose of each jam prevention assembly 300 is to detect non-movement of conveyed items and to initiate accumulation from that point on upstream. This would be needed in the event that a jam occurred during operation of conveyer 10 in the release or non-accumulation mode, or in the case of malfunction of one of the sensors 68 or its sensor assembly 161.

An arrangement for a conveyer 10, that would utilize the pneumatic circuit configuration of FIG. 24, would include for example, a number of successive sections I, II, III, etc. with each such section including a number of zones A, B, C, etc. In FIG. 24 only the last zone "N" of Section I is shown as are the first three zones A, B & C of Section II. It should be understood that any convenient number of sections might be utilized and that each such section could include any convenient number of zones; all depending upon the length of the conveyor 10. The first such zone (Zone A) of each such Section (except for the first Section which would include as its first zone a discharge zone) would be equipped with a jam prevention assembly or "fuse" 300 including a sensor assembly 161C disposed for coaction with the valve assembly 310.

Sensor assembly 161C may be identical to sensor assembly 161 except that there will be no air supply to its bore 218 (FIG. 5); and, as such its spring 122 will keep its piston 116 fully seated within bore 218 (as shown for the sensor assemblies in FIGS. 17B, 18A, 18B and 19A). The end of the piston rod 120 for such piston 116 will, however, still be disposed to coact with an operating button 312 of valve assembly 310 in the same manner that the end of a piston rod 120 coacted with a button 222 of valve 92 of the previously described embodiments. Alternatively sensor assembly 161C could be constructed with its primary sensor roll bracket 78 replaced by a secondary sensor roll bracket 72 (FIGS. 6 & 7); in which configuration a wall 141 of bracket 72 would be disposed to coact with button 312 of valve assembly 310.

Valve assembly 310 includes an air inlet port and an air outlet port with a stem attached to its button 312 and an internal spring urging the stem to a position to close off the air passage between the inlet port and the outlet port. When the stem is so disposed an exhaust air passage is established for valve 310 through which its outlet port communicates with a pair of tapped exhaust ports provided for valve 310. One of the tapped exhaust ports is fitted with a restrictive orifice 314 that exhausts to atmosphere and the other exhaust port is fitted with a check valve 316 that is connected through a pneumatic line 216C to line 230 connected to the outlet port of the valve 92 in the adjacent downstream zone and in a manner that when such lines 216C and 230 are pressurized by air flow through said valve 92 of the adjacent downstream zone that air can not be exhausted through check valve 316. Valve assembly 310 may preferably be a Clippard #CS-1050 or equivalent; while check valve 316 may preferably be a Clippard MCV-1 or equivalent and orifice 314 may preferably be a Clippard 12676-XXXX (with the "x" depending upon the size of the orifice which might reasonably be in a range between 0.003 inches to 0.030 inches, and preferably between 0.010 to 0.015 inches).

In operation the sensor roller 68 for each sensor assembly 161C would remain above the operating plane of conveyor rollers 18 and would be contacted by and deflected or rocked by conveyed items or packages as they are moved thereover by powered rollers 18. During non-accumulation operation of conveyor 10 the aforesaid rocking of a sensor assembly 161C moves either the end of its piston 120 (if a bracket 78 is utilized) or wall 141 (if bracket 78 is replaced by a bracket 72) away from button 312 of valve assembly 310. The internal spring within valve assembly 310 moves the valve stem to interrupt the flow of air through valve assembly 310 to line 230 and the adjacent upstream actuators 60 and bore 218 for the adjacent upstream sensor assembly 161 (i.e. in Section II, Zone B). Such action would, except for the pneumatic circuit configuration of Zones N, A and B of FIG. 24, permit exhaustion of air from lines 216B and 230, disconnection of drive power to rollers 18 of zone B and the rocking of sensor roller 68 in zone B above the plane of conveyor rollers 18. However, such removal of power from rollers 18 and the disposition of sensor roller 68 above the plane of rollers 18 is retarded for zone B due to the exhaust arrangement for valve assembly 310. A relatively rapid exhaust for valve assembly 310 could occur through line 216C to line 230 and the exhaust port of valve 92 of zone N of Section I but check valve 316 remains closed due to the pressurization of lines 230 and 216C from that valve 92 of zone N in Section I. Exhaust of air from actuators 60 and bore 218 of zone B of Section II through lines 230 and 216B and through valve assembly 310 can therefore only take place through orifice 314 which is sized small enough to prevent disengagement of drive to rollers 18 of zone B and the operation of valve 92 in zone B during normal throughput. Sensor rollers 68 for each such zone A return to their disposition above the plane of the rollers 18 as each package passes over and off the roller 68; re-engaging button 312 to re-pressurize lines 230 and 216B of zones B, thus replenishing the relatively small amount of pressure that is bled-off while sensor rollers 68 were depressed.

When an item or package remains stationary upon a sensor roller 68 where a jam prevention assembly 300 is disposed in the zone (as for zone A of Section II in FIG. 24) its valve assembly 310 remains in the disposition closing off air from line 212 through the valve and opening the air passages to the exhaust ports of the valve, long enough to bleed of enough air through orifice 314 to exhaust lines 230 and 216B and actuators 60 and bores 218 of the next adjacent upstream zone. This initiates package accumulation from that zone of the conveyor towards the head end or input end to the conveyor and in the manner hereinbefore described for package accumulation.

During an accumulation mode line 216C is depressurized because control valve 92 of the adjacent downstream zone has been operated to cut-off the supply of air to its line 230. Subsequent operation of sensor roller 68 in a zone A will operate its valve 310 to cut-off the supply of air to actuators 60 in zone B and the air therein will be exhausted in a relatively rapid manner through valve 310 and its check valve 316 and through depressurized line 216C, line 230 and valve 92 of the adjacent downstream zone. Accumulation would then continue towards the head end of conveyor 10 in the aforedescribed manner.

An alternative restrictive orifice and check valve arrangement, for use with and in the various pneumatic circuit configurations described hereinabove is shown in FIG. 25. A restrictive orifice 350 is shown disposed in an air conduit or line 352 between a first location 354 and a second location 356 thereof. A check valve 360 is disposed in parallel with orifice 350 and is arranged to provide for free flow of air in the direction of arrow Z but obstructs air flow in the direction opposite of arrow Z if there is pressurized air in line 352 flowing in the direction of arrow R. Air flow in line 352 in the direction of arrow R must therefore flow through restrictive orifice 350. If there were no air flow in the direction of arrow R but instead a flow of air in the direction of arrow S the air would flow through both check valve 360 and restrictive orifice 350 in the direction of arrow Z with a greater tendency to flow through check valve 360 as the least restrictive path. Orifice 350 and check valve 360 may be combined as an assembly or be provided as separate components with the combination utilized in place of orifice 228 of FIG. 15 or in line 230 or 226A in one or more locations, or in line 216A to accomplish the function described above.

A flow restrictor such as a "Mott Precision Porous Metal Flow Restrictor" available from Mott Metallurgical Corporation may be used as an alternative to the restrictive orifice above described.

Other variations, modifications, and revisions to the basic configuration of accumulating conveyor 10 will occur to the skilled artisan. For example, while drive chain 24, with removable drive pads 172 is admirably suited for driving rollers 18, other endless chains, belts, line-shafts or other methods of driving a conveyor would also function satisfactorily. Alignment features other than lug 94 on primary sensor roller bracket 78 and the cut-outs in valve bracket 82 could be used to retain the primary brackets and valves 92 in proper relationship. The bore within the body of the primary sensor roller bracket may include a stepped-tapered bore to facilitate assembly of the piston therewith. While only endless drive chain 24 is disclosed, two chains, one on each side of the conveyor, could also be used. Hence the appended claims should be broadly construed in a manner commensurate with the scope of the inventive efforts and should not be unduly limited to their exact, literal, terms.

We claim:

1. A process for controlling the movement of articles moving along a conveyor path from an upstream location within the conveyor path towards a downstream location within the conveyor path; comprising
   a) providing a plurality of conveyor rollers and disposing said conveyor rollers in rotative disposition and in spaced relationship along the conveyor path;
   b) selectively applying rotative power to said conveyor rollers and thereby to articles which may be disposed thereon to move the articles along the conveyor path from the upstream location towards the downstream location;
   c) providing a plurality of sensors;
   d) positioning each such sensor at a different selected location along the conveyor path and by doing so dividing the conveyor path into a plurality of conveyor zones each associated with a particular sensor and each including a predetermined number of adjacent conveyor rollers;
   e) selectively setting each sensor to either an activated condition wherein said sensor reacts to the presence of an article within the associated conveyor zone, and a deactivated condition wherein said sensor can-not react to the presence of an article within the associated conveyor zone;
   f) interconnecting said sensors so that predetermined ones of said sensors, upstream of a selected sensor, are set to their respective deactivated conditions when said selected sensor is set to its activated condition;
   g) selectively either applying rotative power to, or removing rotature power from, the conveyor rollers in each zone selectively by zone one or more at a time; and
   h) applying rotative power to said conveyor rollers in all zones wherein said sensors are set to their respective deactivated conditions.

2. The process of claim 1 including removing rotative power from conveyor rollers in a zone wherein the associated selected sensor is set to its activated condition.

3. The process of claim 1 including setting a sensor to an intermediate condition to also remove rotative power from the conveyor rollers in the associated zone.

4. The process of claim 1 including providing a plurality of spaced selected sensors and disposing same in activated condition in spaced relationship along the conveyor path with at least one sensor disposed in deactivated condition between successive ones of the selected sensors disposed in activated condition.

5. The process of claim 4 wherein there are a plurality of said sensors set into deactivated condition disposed between successive pairs of sensors set into their activated condition.

6. The process of claim 3 wherein setting a selected sensor from its activated condition into its said intermediate condition effects setting of the next adjacent upstream sensor from its said deactivated condition to its activated condition.

7. The process conveyor of claim 6 wherein each sensor, when set to its activated condition, will react to an article moving along the conveyor path and be reset thereby from its activated condition to its intermediate condition.

8. The process of claim 7 wherein each sensor so set to its intermediate condition effects setting of the next adjacent upstream conveyor zone associated sensor to its activated condition from its deactivated condition.

9. An accumulating conveyor comprising:
   a) a support structure;
   b) a plurality of rotatable rollers carried by said support structure so as to define a bed for a conveyor;
   c) drive means coating with said rollers to rotate same;
   d) motor means for energizing said drive means;
   e) sensor means positioned along the length of said support structure to divide said plurality of rotatable rollers into a plurality of zones;
   f) each of said sensor means including a primary sensor roller bracket supported by said support structure and a secondary roller bracket also supported by said support structure, selected ones of said primary sensor roller brackets and of said secondary roller brackets coacting with one another for movement in concert;
   g) a sensor roller secured within said brackets to extend across said bed of the conveyor parallel to said rotatable rollers;
   h) a bore carried by each primary sensor roller bracket and a piston movable within said bore;
   i) a pneumatic circuit, including a pressurized line connected to each bore to pressurize same and thus move the piston therewithin; and j) valves located proximate to said sensor rollers, whereby pivotal movement of said sensor rollers operates said valves and controls the operation of said pneumatic circuit.

10. An accumulating conveyor as defined in claim 9 wherein each said primary sensor roller bracket comprises an upwardly and forwarding projecting arm, a cylindrical body with an outwardly opening bore, and a depending leg, and means defined in said arm to receive an end of one of said sensor rollers and an end of one said rotatable rollers in parallel relationship.

11. An accumulating conveyor as defined in claim 10 wherein a retainer bushing is seated in the open end of said bore, said bushing having an axial bore, and said piston has a projecting rod that extend through said axial bore.

12. An accumulating conveyor as defined in claim 11 further including a spring that is seated in said bushing and projects into said bore to fit about said projecting rod, said spring urging the piston inwardly against the pressure introduced into said bore by said pneumatic circuit.

13. An accumulating conveyor as defined in claim 11 wherein a seal is situated about the periphery of said piston to engage the wall of said bore.

14. An accumulating conveyor as defined in claim 10 wherein a lug is formed on the underside of said arm of said primary sensor roller bracket, and each of said valves is retained in a bracket secured to said support structure, said bracket having at least one cut-out formed therein, said lug fitting into said cut-out to assure alignment between said primary sensor roller bracket and said bracket for said control valve.

15. An accumulating conveyor as defined in claim 10 wherein said secondary roller sensor bracket comprises an upwardly and forwardly projecting arm, a body, and a depending leg, means defined in said arm to receive one end of one of said sensor rollers and one end of one of said rotatable rollers in parallel relationship.

16. An accumulating conveyor as defined in claim 15 wherein one end of a spring is secured to said depending leg of said secondary roller sensor bracket, and the opposite end of said spring is secured to said support structure, said spring exerting a biasing force upon said brackets and said rollers secured therein.

17. An accumulating conveyor as defined in claim 16 wherein several laterally spaced notches are formed in said support structure, at least one end of said spring being selectively secured within one of said notches to adjust the biasing force upon said brackets and said rollers secured therein.

18. An accumulating conveyor as defined in claim 16 wherein a connecting rod extends longitudinally between the depending legs of a pair of secondary sensor roll brackets, one end of said connecting rod being secured to one of said brackets and the other end of said connecting rod being secured to the other of said brackets.

19. An accumulation conveyor for moving articles along a conveyor path from an upstream location within the conveyor path towards a downstream location within the conveyor path; comprising:

(a) conveyor roller means including a plurality of spaced conveyor rollers for supporting and moving articles along the conveyor path;

(b) conveyor roller support means rotatively supporting said conveyor roller means in spaced relationship along the conveyor path;

(c) drive means for applying rotative power to said conveyor roller means and thereby to articles to move articles along the conveyor path from the upstream location towards the downstream location;

(d) a plurality of sensor means each positioned at a different selected location along the conveyor path dividing the conveyor path into a plurality of conveyor zones each associated with a particular sensor means and each including a predetermined number of adjacent conveyor rollers;

(e) an activating means for each of said sensor means each said activating means coacting with an associated sensor means to selectively set its associated sensor means to either an activated condition, wherein said associated sensor means reacts to the presence of an article within the associated conveyor zone, or a deactivated condition wherein said associated sensor means does not react to the presence of an article within the associated conveyor zone;

(f) operating means interconnecting said sensor means so that at least the next adjacent one of said sensor means, upstream of a selected sensor means, is set to its respective deactivated condition when a selected sensor means is set to its activated condition; and (g) drive selection means coacting with said drive means to either apply rotative power to, or remove rotative power from the conveyor rollers, selective by zone, one or more zones at a time.

20. The accumulation conveyor of claim 19, said drive selection means applying rotative power to said conveyor rollers in at least all zones wherein said sensor means are set to their respective deactivated conditions.

21. The accumulation conveyor of claim 20 wherein each sensor means is also settable to an intermediate condition; said activating means and said operating means associated with a respective sensor means also coacting with each other and with said drive selection means, when their associated sensor means is set to said intermediate condition, to remove rotative power from the conveyor rollers in the associated conveyor zone.

22. The accumulation conveyor of claim 20 wherein said drive selection means may also remove rotative power from said conveyor rollers in a zone wherein said associated selected sensor means is set to its activated condition.

23. The accumulation conveyor of claim 20 wherein there are a plurality of spaced ones of said selected sensor means disposed in activated condition disposed in spaced relationship along the conveyor path with at least one sensor means disposed in deactivated condition disposed between successive ones of said selected sensor means that are in said activated condition.

24. The accumulation conveyor of claim 23 wherein there are a plurality of said sensor means disposed in deactivated condition disposed between successive ones of said selected sensor means disposed in said activated conditions.

25. The accumulation conveyor of claim 20 wherein each sensor and means includes at least a sensor portion movably mounted for movement between a first position disposed within the path of movement of articles when the articles are moving along the conveyor path and a second position removed from the path of movement of articles when moving along the conveyor path.

26. The accumulation conveyor of claim 25 wherein said sensor portion is also mounted for movement to a position intermediate said first position and said second position.

27. The accumulating conveyor of claim 26 wherein:

a) said sensor portion of each said sensor means when disposed in said first position thereof will coact with an article moving along the conveyor path and be moved thereby from said first position thereof towards said second position thereof and into an intermediate position therebetween;

b) said movement of said portion of a selected sensor means from its said first position to its intermediate position being effected when an article moving along the conveyor path coacts with said sensor portion of the selected sensor means and moves same into its said intermediate position.

28. The accumulation conveyor of claim 27 wherein said sensor portion of each sensor means spans the conveyor path.

29. The accumulation conveyor of claim 28 wherein said sensor portion of each sensor means comprises a roller spanning the conveyor path.

30. The accumulation conveyor of claim 28 wherein said sensor portion of each sensor means comprises a pair of rollers each spanning the conveyors path.

31. The accumulation conveyor of claim 27 including biasing means urging each of said sensor portions from its said second position to its said first position.

32. The accumulation conveyor of claim 31 wherein said biasing means is a spring biased means.

33. The accumulation conveyor of claim 27 wherein said operating means includes starting means which when operated effects movement of said sensor portion of a sensor means, when in its said intermediate position, to its said second position and by doing so applies rotative power to the associated conveyor rolls.

34. The accumulation conveyor of claim 33 wherein said operating means, upon movement of a sensor means to its second position due to operation of said starting means, also effects movement of said sensor portions of successive upstream sensor means to their respective second positions if such are in their respective intermediate positions.

35. The accumulation conveyor of claim 20 wherein said selected sensor means set to its activated condition is at least the one that is next adjacent the most downstream one of said sensor means that are in their said deactivated condition.

36. The accumulation conveyor of claim 21 wherein said operating means coacts with said sensor means so that setting of a selected sensor means from its activated condition into its intermediate condition effects setting of the next adjacent upstream sensor means from its deactivated condition to its said activated condition.

37. The accumulation conveyor of claim 36 wherein said operating means includes fluid and fluid circuitry.

38. The accumulation conveyor of claim 37 wherein said fluid is air.

39. The accumulation conveyor of claim 36 wherein each said sensor means when set to its said activated condition will react to an article moving along the conveyor path and be reset thereby from its said activated condition to its said intermediate condition.

40. The accumulation conveyor of claim 39 wherein each said sensor means so set to its intermediate condition effects setting of the next adjacent upstream conveyor zone associated sensor means to its activated condition from its inactivated condition.

41. The accumulation conveyor of claim 26 wherein said operating means includes fluid circuitry and said fluid circuitry includes:

a) first fluid conduit means disposed to provide a supply of fluid to said operating means;

b) a plurality of zone fluid conduit means, there being one such zone fluid conduit means for each of said conveyor zones to supply fluid thereto;

c) a valve means for each of said zone fluid conduit means coacting therewith and with said first fluid conduit means to control the flow of fluid from said first fluid conduit means to a respective coacting zone fluid conduit means;

d) each of said valve means being selectively settable between a first disposition during which fluid from said first conduit may flow to the zone fluid conduit means and a second disposition during which fluid from said first fluid conduit means cannot flow to the zone fluid conduit means and during which fluid from said zone fluid conduit mean may exhaust to atmosphere; and e) a valve setting mean disposed for coaction with each of said valve means to selectively set its associated valve means either to its first disposition or its second disposition;

f) selected ones of said valve setting means being disposed for coaction with said sensor means for a predetermined one of said conveyor zones to be selectively set by said sensor means and thereby to set its associated valve means to either its said first disposition or its said second disposition; and g) each said associated valve means being disposed to control the flow of fluid from said first fluid conduit means to a respective coacting zone fluid conduit means for the next adjacent upstream conveyor zone.

42. The accumulation conveyor of claim 41 wherein each said valve setting means is included as part of its associated valve means.

43. The accumulation conveyor of claim 42 wherein fluid may flow from said first conduit means through each of said valve means and to the zone fluid conduit means associated with each respective one of said valve means when a valve means is in said first disposition thereof and from said zone fluid conduit means to atmosphere when said zone fluid conduit means is in said second disposition thereof.

44. The accumulation conveyor of claim 43 wherein one or more of particular ones of said conveyor zones are spaced from each other by one or more conveyor zones and each include a special air flow control means coacting with its associated valve means to control the flow of air to atmosphere.

45. The accumulation conveyor of claim 44 wherein each of said special air flow control means includes a restrictive orifice which permits the air flow to atmosphere in a relatively slow manner.

46. The accumulation conveyor of claim 41 wherein each of said sensor means includes a fluid operated means and a fluid flow control means is disposed for coaction with each of said zone fluid conduit means to control the flow of fluid to at least said fluid operated means.

47. The accumulation conveyor of claim 46 wherein each said fluid flow control means is disposed in its respective zone fluid conduit means and controls the flow of fluid to and from its associated fluid operating means.

48. The accumulation conveyor of claim 47 wherein each of said fluid flow control means includes a restrictive orifice for controlling the flow of fluid to and from its associated fluid operated means.

49. The accumulation conveyor of claim 48 wherein each of said fluid flow control means also includes a check valve disposed to facilitate the flow of fluid from its associated fluid operated means to atmosphere.

50. The accumulation conveyor of claim 47 wherein each said fluid flow control means is disposed in its respective zone fluid conduit means and controls the flow of fluid to and from its associated fluid operated means and said drive selection means for the conveyor zone for said activating means.

51. The accumulation conveyor of claim 50 wherein each said fluid flow control means includes a restrictive orifice for controlling the flow of fluid to and from its associated fluid operated means.

52. The accumulation conveyor of claim 51 wherein each of said fluid flow control means also includes a check valve disposed to facilitate the flow of fluid from its associated fluid operated means to atmosphere.

53. The accumulation conveyor of claim 50 wherein said fluid flow control means is disposed in its respective zone fluid conduit means to facilitate the flow of fluid from said first fluid conduit means to its associated valve means.

54. The accumulation conveyor of claim 41 wherein at least one of said valve setting means is not disposed for coaction with an activating means but instead controls the flow of fluid from said first fluid conduit means to a second fluid conduit means disposed to conduit fluid at least to and from a discharge zone fluid conduit means for a discharge conveyor zone and to drive selection means for said discharge conveyor zone to selectively either operate or not operate said conveyor rollers thereof.

55. The accumulation conveyor of claim 54 wherein said second fluid conduit means also conducts fluid to at least one special upstream conveyor zone spaced by at least one upstream conveyor zone from said discharge conveyor zone.

56. The accumulating conveyor of claim 55 wherein said at least one special conveyor zone is spaced by a selected number of upstream conveyor zones from said discharge conveyor zone.

57. The accumulating conveyor of claim 56 wherein said second fluid conduit means also conducts fluid to a selected number of special upstream conveyor zones each spaced from each other by a selected number of upstream conveyor zones.

58. The accumulating conveyor of claim 57 wherein each such special upstream conveyor zone includes fluid operated means carried by its sensor means and disposed for cooperation with the said valve setting means for the respective conveyor zone to set said valve setting means and thereby its associated valve means either to its first disposition or its second disposition.

59. The accumulating conveyor of claim 58 including a fluid flow control means coacting with each fluid operated means of each of said special upstream conveyor zone fluid operated means to control the flow of fluid thereto and therefrom.

60. The accumulation conveyor of claim 45 wherein each of said special air flow control means also includes a check valve disposed in a special fluid conduit connecting an exhaust port of its respective valve means to the zone fluid conduit means of the next adjacent downstream conveyor zone such that as long as there is fluid its associated downstream zone fluid conduit means said check valve prevents the flow of fluid from its associated valve means through said valve means of the next adjacent downstream conveyor zone and such that when there is no fluid in its associated downstream zone fluid conduit means said check valve permits the exhaust to atmosphere of fluid through said next adjacent downstream conveyor zone valve means.

61. A method of operating an accumulating conveyor, said accumulating conveyor comprising:

a) a support structure;

b) a plurality of rotatable rollers carried by said support structure to define a bed for a conveyor;

c) drive means coacting with said rollers to rotate same;

d) motor means for energizing said drive means;

e) a plurality of sensor means positioned along the length of said support structure to divide said plurality of rotatable rollers into a plurality of zones;

f) each of said sensor means including a primary sensor roller bracket carried by said support structure and a secondary sensor roller bracket also carried by said support structure;

g) a sensor roller secured within said brackets to extend across the bed of said conveyor parallel to said rotatable rollers;

h) a bore carried by each primary sensor roller bracket and a piston movable within said bore, and i) valves located proximate to said sensor rollers;

the method of operating said accumulator comprising the steps of:

1) biasing each sensor roller to actuate its respective sensor valve;

2) pressurizing the bore of each primary sensor roller bracket to force its piston to project therefrom; until said piston engages an adjacent valve, and 3) pivoting a respective sensor roller until said sensor roller achieves a position below the plane of the bed of the conveyor, whereby objects passing along the conveyor bed will not contact said sensor roller.

62. The method of operating the accumulating conveyor of claim 61 further including the step of: bleeding the pressurized air from the bore of selected primary sensor roller brackets so that said sensor roller bracket and sensor roller pivots upwardly above the plane of the bed of the conveyor.

63. The method of operating the accumulating conveyor of claim 61 further including the step of: correlating the opening and closing operation of an adjacent valve with the operation of said drive means in the preceding upstream zone of said conveyor.

64. An accumulation conveyor for moving articles along a conveyor path from an upstream location within the conveyor path towards a downstream location within the conveyor path; comprising:

(a) a plurality of spaced conveyor rollers;

(b) a conveyor roller support rotatively supporting said conveyor rollers in spaced relationship along the conveyor path;

(c) a conveyor drive for applying rotative power to said conveyor rollers and thereby to articles to move articles along the conveyor path from the upstream location towards the downstream location;

(d) a plurality of sensors each positioned at a different selected location along the conveyor path dividing the conveyor path into a plurality of conveyor zones each associated with a particular sensor and each including a predetermined number of adjacent conveyor rollers;

(e) an activator for each of said sensors each said activator coacting with an associated sensor to selectively set its associated sensor to either an activated condition, wherein said associated sensor can react to the presence of an article within the associated conveyor zone, or a deactivated condition wherein said associated sensor cannot react to the presence of an article within the associated conveyor zone;

(f) an operator interconnecting said sensors so that at least the next adjacent one of said sensors, upstream of a selected sensor, is set to its respective deactivated condition when the selected sensor is set to its activated condition; and (g) a drive selector coacting with said conveyor drive to either apply rotative power to, or remove rotative power from the conveyor rollers, selective by zone, one or more zones at a time.

65. The accumulation conveyor of claim 64, said drive selector applying rotative power to said conveyor rollers in at least all zones wherein said sensors are set to their respective deactivated conditions.

66. The accumulation conveyor of claim 65 wherein each sensor is also settable to an intermediate condition; said activator and said operator associated with a respective sensor also coacting with each other and with said drive selector, when their associated sensors are set to said intermediate condition, to remove rotative power from the conveyor rollers in the associated conveyor zone.

67. The accumulation conveyor of claim 64 wherein said drive selector may also remove rotative power from said conveyor rollers in a zone wherein said associated selected sensor is set to its activated condition.

68. The accumulation conveyor of claim 65 wherein said selected sensor set to its activated condition is at least the one that is next adjacent the most downstream one of said sensors that are in their said deactivated condition.

69. The accumulation conveyor of claim 64 wherein there are a plurality of spaced ones of said selected sensors disposed in activated condition disposed in spaced relationship along the conveyor path with at least one sensor disposed in deactivated condition disposed between successive ones of said selected sensors that are in said activated condition.

70. The accumulation conveyor of claim 69 wherein there are a plurality of said sensors disposed in deactivated condition disposed between successive ones of said selected sensors disposed in said activated conditions.

71. The accumulation conveyor of claim 66 wherein said operator coacts with said sensors so that setting of a selected sensor from its activated condition into its intermediate condition effects setting of the next adjacent upstream sensor from its deactivated condition to its activated condition.

72. The accumulation conveyor of claim 71 wherein said operator includes fluid and fluid circuitry.

73. The accumulation conveyor of claim 72 wherein said fluid is air.

74. The accumulation conveyor of claim 71 wherein each said sensor when set to its said activated condition will react to an article moving along the conveyor path and be reset thereby from its said activated condition to its said intermediate condition.

75. The accumulation conveyor of claim 74 wherein each said sensor so set to its intermediate condition effects setting of the next adjacent upstream conveyor zone associated sensor to its activated condition from its deactivated condition.

76. The accumulation conveyor of claim 65 wherein each sensor includes at least a sensor portion movably mounted for movement between a first position disposed within the path of movement of articles when the articles are moving along the conveyor path and a second position removed from the path of movement of articles when moving along the conveyor path.

77. The accumulation conveyor of claim 76 wherein said sensor portion is also mounted for movement to a position intermediate said first position and said second position.

78. The accumulating conveyor of claim 77 wherein:
(a) said sensor portion of each said sensor when disposed in said first position thereof will coact with an article moving along the conveyor path and be moved thereby from said first position thereof towards said second position thereof and into an intermediate position therebetween;
(b) said movement of said portion of a selected sensor from its said first position to its intermediate position being effected when an article moving along the conveyor path coacts with said sensor portion of the selected sensor and moves same into its said intermediate position.

79. The accumulation conveyor of claim 78 wherein said first sensor portion of each sensor spans the conveyor path.

80. The accumulation conveyor of claim 79 wherein said sensor portion of each sensor means comprises a roller spanning the conveyor path.

81. The accumulation conveyor of claim 79 wherein said sensor portion of each sensor comprises a pair of rollers each spanning the conveyors path.

82. The accumulation conveyor of claim 78 including biasing means urging each of said sensor portions from its said second position to its said first position.

83. The accumulation conveyor of claim 82 wherein said biasing means is a spring biased means.

84. The accumulation conveyor of claim 78 wherein said operator includes a starter which when operated effects movement of said sensor portion of a sensor when in its said intermediate position, to its said second position and by doing so applies rotative power to the associated conveyor rollers.

85. The accumulation conveyor of claim 84 wherein said operator, upon movement of a sensor to its second position due to operation of said starter, also effects movement of said sensor portions of successive upstream sensors to their respective second positions if such are in their respective intermediate positions.

86. The accumulation conveyor of claim 78 wherein said operator includes fluid circuitry and said fluid circuitry includes:
(a) a first fluid conduit disposed to provide a supply of fluid to said operator;
(b) a plurality of zone fluid conduit, there being one such zone fluid conduit for each of said conveyor zones to supply fluid thereto;
(c) a valve for each of said zone fluid conduits coacting therewith and with said first fluid conduit to control the flow of fluid from said first fluid conduit to a respective coacting zone fluid conduit;
(d) each of said valves means being selectively settable between a first disposition during which fluid from said first conduit may flow to the zone fluid conduit and a second disposition during which fluid from said first fluid conduit cannot flow to the zone fluid conduit and during which fluid from said zone fluid conduit may exhaust to atmosphere; and
(e) a valve setter disposed for coaction with each of said valves to selectively set its associated valve either to its first disposition or its second disposition;
(f) selected ones of said valve settors being disposed for coaction with said sensors for a predetermined one of said conveyor zones to be selectively set by a said sensor and thereby to set its associated valve to either its said first disposition or its said second disposition; and
(g) each said associated valves being disposed to control the flow of fluid from said first fluid conduit to a respective coacting zone fluid conduit for the next adjacent upstream conveyor zone.

87. The accumulation conveyor of claim 86 wherein each said valve setter is included as part of its associated valve.

88. The accumulation conveyor of claim 87 wherein fluid may flow from said first conduit through each of said valves and to the zone fluid conduit associated with each respective one of said valves when a valve is in said first disposition thereof and from said zone fluid conduit to atmosphere when said zone fluid conduit is in said second disposition thereof.

89. The accumulation conveyor of claim 86 wherein each of said sensors includes a fluid operator and a fluid flow control disposed for coaction with each of said zone fluid conduits to control the flow of fluid to at least said fluid operator.

90. The accumulation conveyor of claim 89 wherein each said fluid flow control is disposed in its respective zone fluid conduit and controls the flow of fluid to and from its associated fluid operator.

91. The accumulation conveyor of claim 90 wherein each of said fluid flow controls includes a restrictive orifice for controlling the flow of fluid to and from its associated fluid operator.

92. The accumulation conveyor of claim 91 wherein each said fluid flow control also includes a check valve disposed to facilitate the flow of fluid from its associated fluid operator to atmosphere.

93. The accumulation conveyor of claim 90 wherein each said fluid flow control is disposed in its respective zone fluid conduit and controls the flow of fluid to and from its associated fluid operator and said drive selector for the conveyor zone for said activator.

94. The accumulation conveyor of claim 93 wherein each said fluid flow control includes a restrictive orifice for controlling the flow of fluid to and from its associated fluid operator.

95. The accumulation conveyor of claim 94 wherein each said fluid flow control also includes a check valve disposed to facilitate the flow of fluid from its associated fluid operator to atmosphere.

96. The accumulation conveyor of claim 93 wherein said fluid flow control is disposed in its respective zone fluid conduit to facilitate the flow of fluid from said first fluid conduit to its associated valve.

97. The accumulation conveyor of claim 86 wherein at least one of said valve settors is not disposed for coaction with an activator but instead controls the flow of fluid from said first fluid conduit to a second fluid conduit disposed to conduit fluid at least to and from a discharge zone fluid conduit for a discharge conveyor zone and to a drive selector for said discharge conveyor zone to selectively either operate or not operate said conveyor rollers thereof.

98. The accumulation conveyor of claim 97 wherein said second fluid conduit also conducts fluid to at least one special upstream conveyor zone spaced by at least one upstream conveyor zone from said discharge conveyor zone.

99. The accumulating conveyor of claim 97 wherein said at least one special conveyor zone is spaced by a selected number of upstream conveyor zones from said discharge conveyor zone.

100. The accumulating conveyor of claim 99 wherein said second fluid conduit also conducts fluid to a selected number of special upstream conveyor zones each spaced from each other by a selected number of upstream conveyor zones.

101. The accumulating conveyor of claim 100 wherein each such special upstream conveyor zone includes fluid operator carried by its sensor and disposed for cooperation with the said valve setter for the respective conveyor zone to set said valve setter and thereby its associated valve either to its first disposition or its second disposition.

102. The accumulating conveyor of claim 101 including a fluid flow control coacting with each fluid operator of each of said special upstream conveyor zones to control the flow of fluid thereto and therefrom.

103. The accumulation conveyor of claim 88 wherein one or more of particular ones of said conveyor zones are spaced from each other by one or more conveyor zones and each include a special air flow control coacting with its associated valve to control the flow of air to atmosphere.

104. The accumulation conveyor of claim 103 wherein each of said special air flow control includes a restrictive orifice which permits the air flow to atmosphere in a relatively slow manner.

105. The accumulation conveyor of claim 104 wherein each of said special air flow controls also includes a check valve disposed in a special fluid conduit connecting an exhaust port of its respective valve to the zone fluid conduit of the next adjacent downstream conveyor zone such that as long as there is fluid its associated downstream zone fluid conduit said check valve prevents the flow of fluid from its associated valve through said valve of the next adjacent downstream conveyor zone and such that when there is no fluid in its associated downstream zone fluid conduit said check valve permits the exhaust to atmosphere of fluid through said next adjacent downstream conveyor zone valve.

106. An accumulation arrangement for use with a predetermined length of conveyor having a plurality of conveyor rollers rotatively supported in a conveyor path and a conveyor roller drive disposed for coaction with the conveyor rollers to either drive selected sections of conveyor rollers to move an article or articles from an upstream input end of predetermined length of conveyor towards a downstream output end of the predetermined length of conveyor, or to not drive selected sections of conveyor rollers, the accumulation arrangement comprising:

(a) a plurality of article sensors disposed in spaced positions along the conveyor path and dividing the conveyor rollers into the conveyor sections, each article sensor being associated with a particular one of said conveyor sections;

(b) each said article sensor being settable to either an activated condition, a deactivated condition, or an intermediate condition;

(c) sensor connections interconnecting successive sensors so that the setting of a downstream sensor to one of its settable conditions effects a setting of at least the next successive upstream sensor to one of its settable conditions; and (d) a bypass control coacting with said sensors and operable to set selective ones of sensors to said activated condition even though the next downstream sensor is set to its deactivated condition (e) the setting of a sensor to one of said settable conditions also affecting operation of said roller drive, wherein said sensor connections effect setting of an upstream sensor to its deactivated condition when the next successive downstream sensor is set either to its activated condition or its deactivated condition as well as operation of the roller drive in the conveyor sections associated with the sensors so set to their deactivated conditions to drive said conveyor rollers of those conveyor sections, wherein said sensor connections also effect setting of an upstream sensor to its activated condition when the next successive downstream sensor is set to its intermediate condition as well as discontinuance of operation of the roller drive in the conveyor section associated with the sensor so set to its activated condition so as to not drive the conveyor rollers of that conveyor section, and wherein each sensor includes a sensor bracket pivotally mounted to said predetermined length of conveyor and biased by a spring to said activated condition as well as a valve disposed for operation by a part of said sensor and forming part of said sensor connections.

107. The accumulation arrangement of claim 106 further including an air operated spring biased piston carried by each of said sensor brackets for coaction with an associated valve.

108. The accumulation arrangement of claim 106 wherein said sensor connections are fluid operated and the fluid is air.

* * * * *